(12) United States Patent
Tamura

(10) Patent No.: US 10,739,873 B2
(45) Date of Patent: *Aug. 11, 2020

(54) TRANSMISSION-TYPE ELECTRONIC PEN

(71) Applicant: Wacom Co., Ltd., Saitama (JP)

(72) Inventor: Hideo Tamura, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/293,071

(22) Filed: Mar. 5, 2019

(65) Prior Publication Data

US 2019/0196613 A1    Jun. 27, 2019

Related U.S. Application Data

(63) Continuation of application No. 15/446,851, filed on Mar. 1, 2017, now Pat. No. 10,254,859, which is a
(Continued)

(51) Int. Cl.
*G06F 3/0354* (2013.01)
*G06F 1/3206* (2019.01)
(Continued)

(52) U.S. Cl.
CPC ........ *G06F 3/03545* (2013.01); *G06F 1/3206* (2013.01); *G06F 3/0383* (2013.01);
(Continued)

(58) Field of Classification Search
CPC .................................................. G06F 3/03545
See application file for complete search history.

(56) References Cited

U.S. PATENT DOCUMENTS 8,373,683 B2   2/2013   Katsurahira et al.
8,547,363 B2   10/2013  Xu
(Continued)

FOREIGN PATENT DOCUMENTS

CN   103587292 A   2/2014
JP   7-295722 A    11/1995
(Continued)

OTHER PUBLICATIONS

Extended European Search Report, dated Feb. 26, 2018, for European Application No. 14904435.6-1216 / 3173908, 12 pages.
(Continued)

*Primary Examiner* — Sanjiv D. Patel
(74) *Attorney, Agent, or Firm* — Seed IP Law Group LLP

(57) ABSTRACT

A transmission-type electronic pen that detects a hover state by a position detecting device and achieves power savings is provided. The pen includes a transmission circuit that transmits a signal to a position detecting device and a detector configured to detect a direct act of a user. The pen includes a pressure detector configured to detect whether a pressure is applied to a tip of a core body, and a controller configured to activate and control transmission operation of the transmission circuit based on detection outputs of the detector and the pressure detector. The transmission circuit is controlled in accordance with any of a plurality of transmission operation states including at least a power saving state. When detecting an act of the user, the controller activates and sets the transmission circuit to a first transmission operation state of the plurality of states.

26 Claims, 10 Drawing Sheets

Related U.S. Application Data continuation of application No. PCT/JP2014/078398, filed on Oct. 24, 2014.

(51) Int. Cl.
  *G06F 3/038* (2013.01)
  *G06F 3/044* (2006.01)

(52) U.S. Cl.
  CPC .... *G06F 3/044* (2013.01); *G06F 2203/04101* (2013.01); *G06F 2203/04105* (2013.01)

(56) References Cited

U.S. PATENT DOCUMENTS

| | | |
|---|---|---|
| 8,913,041 B2 | 12/2014 | Fukushima et al. |
| 9,063,025 B2 | 6/2015 | Horie et al. |
| 9,268,417 B2 | 2/2016 | Oda et al. |
| 2011/0090182 A1 | 4/2011 | Xu |
| 2011/0130096 A1* | 6/2011 | Dunkars ............. G06F 3/03545 455/41.2 |
| 2011/0155479 A1 | 6/2011 | Oda et al. |
| 2011/0193776 A1 | 8/2011 | Oda et al. |
| 2011/0241703 A1 | 10/2011 | Fukushima et al. |
| 2012/0050207 A1 | 3/2012 | Westhues et al. |
| 2012/0068964 A1* | 3/2012 | Wright ................ G06F 3/03545 345/174 |
| 2012/0256830 A1* | 10/2012 | Oda ................... G06F 3/03545 345/157 |
| 2012/0327040 A1 | 12/2012 | Simon et al. |
| 2012/0331546 A1 | 12/2012 | Falkenburg et al. |
| 2014/0009863 A1 | 1/2014 | Obata |
| 2014/0028577 A1 | 1/2014 | Krah et al. |
| 2014/0050516 A1 | 2/2014 | Lazaridis et al. |
| 2014/0098033 A1* | 4/2014 | Simmons ............ G06F 3/03545 345/173 |
| 2014/0098073 A1 | 4/2014 | Singh et al. |
| 2014/0192030 A1* | 7/2014 | Ryshtun .............. G06F 3/03545 345/179 |
| 2015/0363012 A1* | 12/2015 | Sundara-Rajan ....... G06F 3/038 345/179 |

FOREIGN PATENT DOCUMENTS

| | | |
|---|---|---|
| JP | 2007-164356 A | 6/2007 |
| JP | 2011-186803 A | 9/2011 |
| JP | 2012-221304 A | 11/2012 |
| JP | 2013-161307 A | 8/2013 |

OTHER PUBLICATIONS

Chinese Office Action, dated Aug. 28, 2019, for Chinese Application No. 201480082067.2, 25 pages. (with English translation).

* cited by examiner

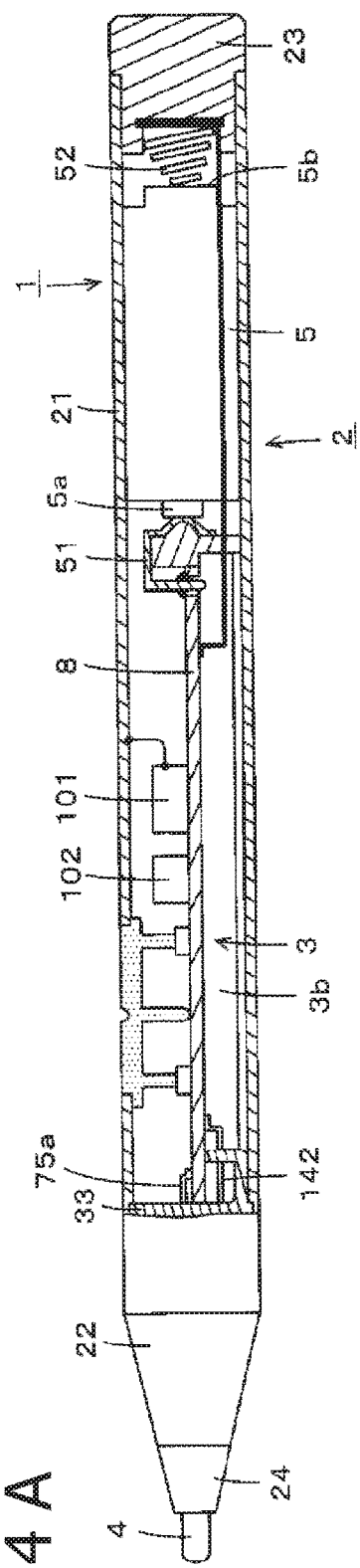
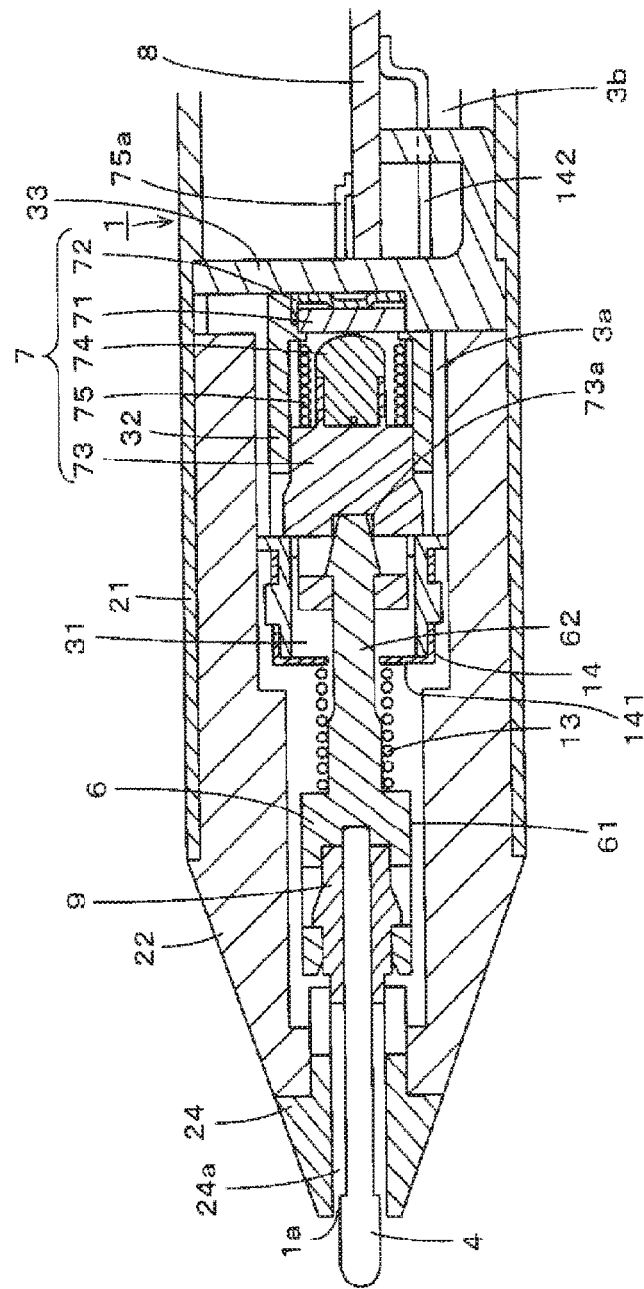
FIG.4A
FIG.4B

1 TRANSMISSION-TYPE ELECTRONIC PEN

1A TRANSMISSION-TYPE ELECTRONIC PEN

TRANSMISSION-TYPE ELECTRONIC PEN

BACKGROUND

Technical Field

This application is directed to a transmission-type electronic pen used with a position detecting device.

Description of Related Art

Position input devices are composed of a position indicator and a position detecting device that detects a position indicated by the position indicator are known. As one of such position input devices, there is a position input device receiving a signal transmitted from a pen-type position indicator by a position detecting device and thereby detecting a position indicated by the position indicator. Specifically, the position indicator used in this kind of position input device is arranged with a configuration of a transmission-type electronic pen that includes a power supply circuit and includes a transmission circuit that transmits a signal from the transmission circuit to the position detecting device (for example, refer to Patent Document 1 (Japanese Patent Publication No. 1995-295722) and Patent Document 2 (Japanese Patent Publication No. 2007-164356)).

As the power supply circuit of this kind of transmission-type electronic pen, an internal power supply circuit including a primary battery and a power supply circuit of a secondary battery charge system has been proposed. However, draining of the battery due to continuous signal transmission is a problem. Specifically, power consumption due to continuous signal transmission is high and, therefore, it is necessary to frequently replace the battery or frequently charge the battery, which is troublesome. Therefore, in this kind of transmission-type electronic pen, a high-density battery has come to be used and a high-capacity double-layer capacitor has come to be used as in Patent Document 2. However, there is a limit also to increasing the battery capacity.

In order to avoid this problem, in this kind of transmission-type electronic pen, there is an electronic pen that is configured such that the transmission circuit starts transmission operation through pressing of a side switch or a knock switch arranged on a shaft (tail part). However, in order to carry out an input operation of a position indication by the transmission-type electronic pen, the switch needs to be pressed, which is troublesome. In addition, there is a problem in that if turning off the switch is forgotten, the transmission circuit keeps on carrying out the transmission operation and the power is uselessly consumed.

Therefore, in this kind of conventional transmission-type electronic pen, there has also been arranged an electronic pen that is configured such that a pressure sensing switch that is turned on by a pressure applied to a core body whose tip serving as a pen tip protrudes to the outside is arranged in a casing and a transmission circuit starts transmission operation by detecting that this pressure sensing switch is turned on.

PRIOR ART DOCUMENTS

Patent Documents

Patent Document 1: Japanese Patent Publication No. 1995-295722

Patent Document 2: Japanese Patent Publication No. 2007-164356

BRIEF SUMMARY

Technical Problems

However, in the transmission-type electronic pen using the pressure sensing switch, action of pressing the pen tip to turn on the pressure sensing switch is necessary. In normal cases, a user presses the pen tip of this kind of transmission-type electronic pen against an input surface of a position detecting device or the vicinity of the input surface to turn on the pressure sensing switch and start transmission, and thereafter carries out position indication operation in the position detecting device.

Therefore, the transmission circuit of this transmission-type electronic pen does not carry out the transmission operation until the pen tip is pressed against the input surface of the position detecting device to turn on the pressure sensing switch, for example. For this reason, it is impossible to carry out detection of the presence of the transmission-type electronic pen over the position detecting device, i.e., detection of a so-called hover state. As a result, time lag is caused although a user starts operation of position indication by the transmission-type electronic pen on the input surface of the position detecting device. Thus, the user is confounded for a moment and a sense of discomfort is caused. This is a significant problem for an electronic pen aimed at offering usability similar to that of paper and a pencil.

Furthermore, in the transmission-type electronic pen, using the pressure sensing switch, after the pressure sensing switch is turned on once, even when the transmission-type electronic pen is separated from the sensor surface of the position detecting device and the pressure sensing switch is turned off, the transmission operation of the transmission circuit is continued until a predetermined time elapses from the turning off of the pressure sensing switch. The purpose of this is to allow the user to immediately carry out the next indication input operation without turning on the pressure sensing switch again when the time of the separation of the transmission-type electronic pen from the input surface of the position detecting device is a short time.

However, the state after the pressure sensing switch is turned off is not only the case in which the user immediately carries out indication input operation again by the electronic pen but also the state in which the user releases the electronic pen from the hand and does not immediately carry out indication input operation again. Conventionally, it is impossible to discriminate between the two and, even when the pressure sensing switch is turned off, always the electronic pen continues the transmission operation of the transmission circuit for the predetermined time and uselessly consumes the power in some cases.

In view of the above problems, the embodiment described herein provide a transmission-type electronic pen that can allow detection of the hover state by a position detecting device to be always possible even at the start of use and can achieve power savings.

Technical Solution

In order to solve the above-described problems, a transmission-type electronic pen used with a position detecting device is provided in accordance with an embodiment, where the transmission-type electronic pen includes:

a tubular casing, a core body arranged in the casing such that a tip thereof protrudes to externally extend from one opening of the casing, a supply source of a source voltage provided in the casing, a transmission circuit that transmits a signal supplied to the position detecting device, a detector configured to detect a direct act of a user to the casing, serving as a trigger for start of use of the transmission-type electronic pen, a pressure detector configured to detect whether a pressure is being applied to the tip of the core body, and a controller configured to control transmission operation of the transmission circuit based on a detection output of the detector and a detection output from the pressure detector, wherein activation control of the transmission circuit is carried out by the controller, and the transmission circuit is controlled to any of a plurality of kinds of transmission operation states including at least a transmission operation state of power saving when being activated, and when detecting an act of the user by the detector, the controller activates the transmission circuit and carries out control to cause the transmission circuit to carry out transmission operation in a first transmission operation state that is any of the plurality of kinds of transmission operation states.

In an embodiment, when a user makes a direct act to the casing through bringing a hand into contact with the casing for holding the casing with the hand or holding the casing with a hand and raising the casing in order to start use of the transmission-type electronic pen, the direct act is detected by the detector.

The controller receives a detection output of the direct act of the user to the casing from this detector and activates the transmission circuit to carry out control to cause the transmission circuit to become the first transmission operation state that is any of the plurality of kinds of transmission operation states and start transmission of a signal.

In this manner, the transmission-type electronic pen becomes in the state in which the transmission circuit transmits the signal through only a direct act to the casing serving as a trigger for the start of use of the transmission-type electronic pen by a user. Thus, the hover state over the input surface of the sensor of the position detecting device can be detected.

Furthermore, when the user causes the transmission-type electronic pen to touch the input surface of the sensor of the position detecting device, the touch is detected by the pressure detector and the pressure detection output is supplied to the controller. The controller controls the transmission operation state of the transmission circuit to achieve further power saving based on the detection output of the direct act of the user to the casing from the detector and the detection output in the pressure detector.

For example, the controller sets the first transmission operation state as a transmission operation state that is a power saving state but allows detection of the hover state. Thereafter, when the transmission-type electronic pen is caused to touch e.g., the input surface of the sensor of the position detecting device by a user and the touch is detected by the pressure detector, the controller carries out control to set the normal operation state from the power saving state to facilitate detection of the position indicated by the transmission-type electronic pen in the position detecting device. Furthermore, when it is detected that the touch with the input surface of the position detecting device by the transmission-type electronic pen is released by the pressure detector in the state in which it is detected that the user is continuing the direct act to the casing serving as a trigger for the start of use of the transmission-type electronic pen based on the detection output of the detector, the controller returns the transmission operation state of the transmission circuit to the transmission operation state of power saving to avoid useless power consumption.

Advantageous Effects

According to the transmission-type electronic pen in accordance with an embodiment, the transmission circuit is activated to be set to the first transmission operation state when a direct act of a user to the casing, serving as a trigger for the start of use of the transmission-type electronic pen, is detected by the detector. Thus, detection of the hover state by the position detecting device can be allowed to be always possible, including when use of the transmission-type electronic pen is started.

Furthermore, in the transmission-type electronic pen, the controller is configured to control the transmission operation of the transmission circuit to any of the plurality of kinds of transmission operation states including at least the transmission operation state of power saving based on the detection output of the detector that detects a direct act of a user to the casing serving as a trigger for the start of use of the transmission-type electronic pen and the detection output from the pressure detector that detects whether a pressure is being applied to the tip of the core body based on the motion of the core body due to the pressure applied to the tip. Thus, further power saving can be achieved.

BRIEF DESCRIPTION OF SEVERAL VIEWS OF THE DRAWINGS

FIGS. 4A and 4B are diagrams showing a mechanical configuration example of the first embodiment of the transmission-type electronic pen.

DETAILED DESCRIPTION

Several embodiments of the transmission-type electronic pen will be described below with reference to the drawings.

First Embodiment

An embodiment of the transmission-type electronic pen according to this disclosure will be described below with reference to drawings. FIG. 1 to FIG. 5 are diagrams of a configuration example of a transmission-type electronic pen 1 in accordance with an embodiment. The transmission-type electronic pen 1 of this embodiment is used with electronic equipment including a position detecting device of a capacitive system.

Figure 1:
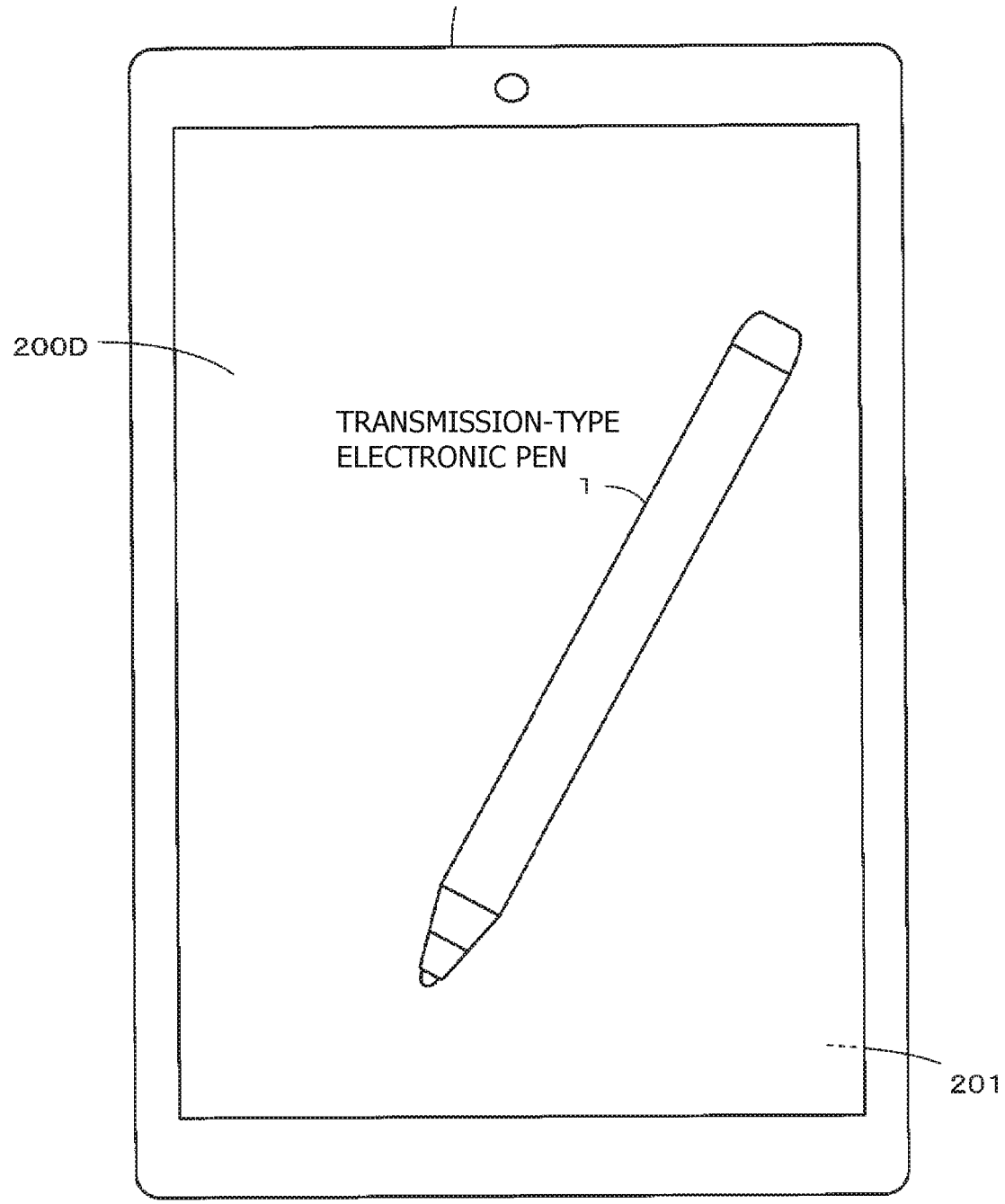
FIG. 1 is a diagram showing a first embodiment of a transmission-type electronic pen with electronic equipment including a position detecting device.

FIG. 1 is a diagram showing one example of a tablet-type information terminal 200 as an example of electronic equipment used with the transmission-type electronic pen 1 according to an embodiment. In this example, the tablet-type information terminal 200 includes a display screen 200D of a display device, such as an LCD (Liquid Crystal Display), and includes a position detecting device 201 of a capacitive system, in this example, at the upper part (front surface side) of the display screen 200D.

[Configuration Example of Position Detecting Device 201]

Figure 2:
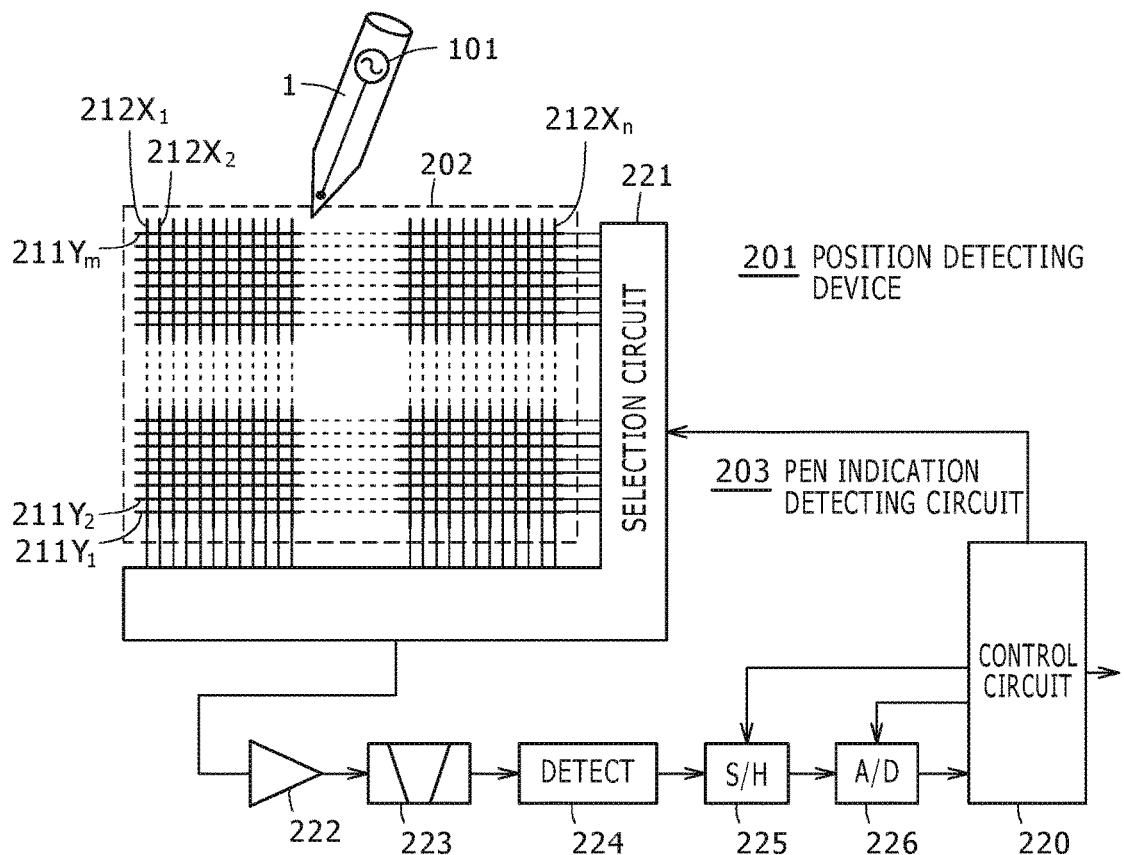
FIG. 2 is a block diagram showing a configuration example of a pen indication detecting circuit of the position detecting device used with the first embodiment of the transmission-type electronic pen.

As shown in FIG. 2, the position detecting device 201 of this embodiment is composed of a sensor 202 that forms this position detecting device 201 and a pen indication detecting circuit 203 connected to this sensor 202.

In this example, the sensor 202 is a component formed by stacking a first conductor group 211, an insulating layer (diagrammatic representation not shown), and a second conductor group 212 sequentially from the lower layer side (a sectional view is not shown). For example, the first conductor group 211 is a group obtained by disposing plural first conductors $211Y_1$, $211Y_2$, ..., and $211Y_m$ (m is an integer equal to or larger than 1) that extend along the horizontal direction (X-axis direction) in the Y-axis direction in parallel, with the plural first conductors $211Y_1$, $211Y_2$, ..., and $211Y_m$ separated from each other by predetermined intervals.

Furthermore, the second conductor group 212 is a group obtained by disposing plural second conductors $212X_1$, $212X_2$, ..., and $212X_n$ (n is an integer equal to or larger than 1) that extend along a direction intersecting the extension direction of the first conductors $211Y_1$, $211Y_2$, ..., and $211Y_m$, specifically the vertical direction (Y-axis direction) orthogonal to the extension direction, in this example, in the X-axis direction in parallel, with the plural second conductors $212X_1$, $212X_2$, ..., and $212X_n$ separated from each other by predetermined intervals.

As above, the sensor 202 of the position detecting device 201 is configured to detect a position indicated by an indicating body, such as the transmission-type electronic pen 1, using the sensor pattern formed the first conductor group 211 intersecting the second conductor group 212.

In the following description, regarding the first conductors $211Y_1$, $211Y_2$, ..., and $211Y_m$, the conductor will be referred to as the first conductor 211Y when there is no need to distinguish between the respective conductors. Similarly, regarding the second conductors $212X_1$, $212X_2$, ..., and $212X_n$, the conductor will be referred to as the second conductor 212X when there is no need to distinguish between the respective conductors.

In the position detecting device 201 of this embodiment, the sensor 202 includes a sensor surface (indication input surface) having a size corresponding to the size of the display screen 200D of the tablet-type information terminal 200 and is formed by the first conductor group 211 and the second conductor group 212 having optical transparency.

The first conductor group 211 and the second conductor group 212 may have a configuration in which the respective groups are disposed on the same surface side of a sensor board, or may have a configuration in which the first conductor group 211 is disposed on one surface side of the sensor board and the second conductor group 212 is disposed on the other surface side.

The pen indication detecting circuit 203 is composed of a selection circuit 221 used as an input/output interface with the sensor 202, an amplifying circuit 222, a band-pass filter 223, a detection circuit 224, a sample/hold circuit 225, an AD (analog-to-digital) conversion circuit 226, and a control circuit 220.

The selection circuit 221 selects a respective one conductor from the first conductor group 211 and the second conductor group 212 based on a control signal from the control circuit 220. The conductors selected by the selection circuit 221 are connected to the amplifying circuit 222 and a signal from the transmission-type electronic pen 1 is detected by the selected conductors and is amplified by the amplifying circuit 222. The output of this amplifying circuit 222 is supplied to the band-pass filter 223 and only a component of the frequency of the signal transmitted from the transmission-type electronic pen 1 is extracted.

An output signal of the band-pass filter 223 is subjected to detection by the detection circuit 224. An output signal of this detection circuit 224 is supplied to the sample/hold circuit 225 and is sampled and held at predetermined timing based on a sampling signal from the control circuit 220. Thereafter, the signal is converted to a digital value by the AD conversion circuit 226. The digital data from the AD conversion circuit 226 is read by the control circuit 220 and is processed.

The control circuit 220 operates to send out a control signal to each of the sample/hold circuit 225, the AD conversion circuit 226, and the selection circuit 221 based on a program stored in a ROM (Read Only Memory) inside the control circuit 220. Furthermore, the control circuit 220 calculates position coordinates on the sensor 202 indicated by the transmission-type electronic pen 1 from digital data from the AD conversion circuit 226, and outputs data of the position coordinates to another processor or the like in the tablet-type information terminal 200.

Figure 3A:
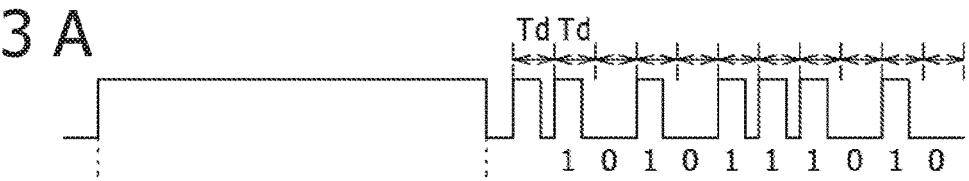
FIGS. 3A-3C are diagrams showing a transmission signal of the first embodiment of the transmission-type electronic pen.
Figure 3B:
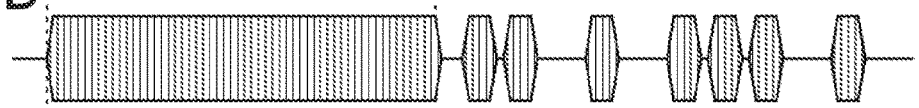
Figure 3C:
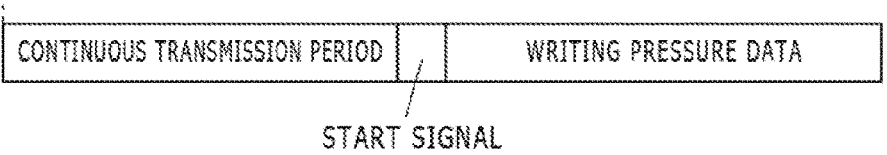
Figure 5:
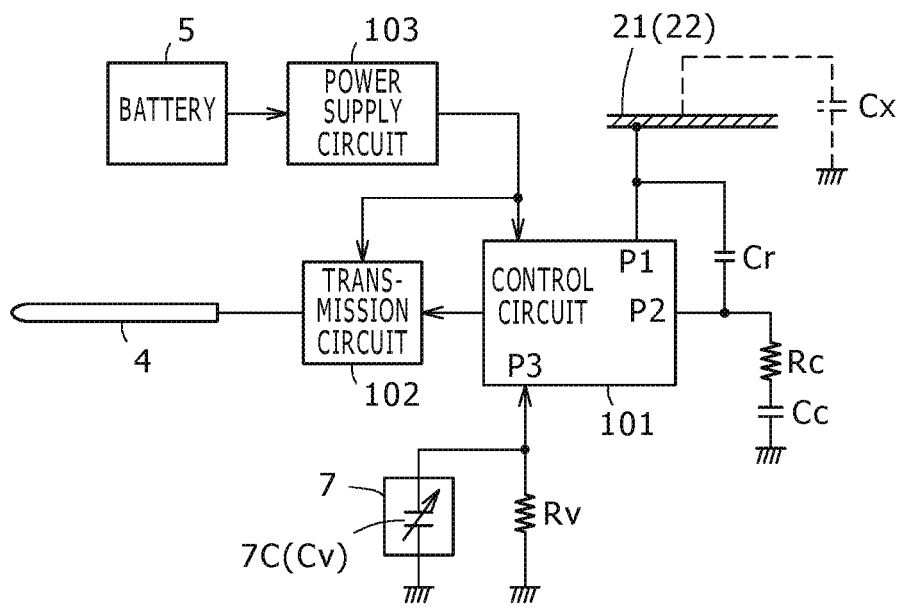
FIG. 5 shows an example configuration of an electronic circuit of the first embodiment of the transmission-type electronic pen.

FIGS. 3A-3C are a timing chart showing a signal of a predetermined pattern from the transmission-type electronic pen 1 received by the sensor 202 of the position detecting device 201 in accordance with of an embodiment. The transmission-type electronic pen 1 of the embodiment includes a control circuit 101 and a transmission circuit 102 as shown in FIG. 5 described below and the transmission circuit 102 repeatedly outputs a signal of the predetermined pattern based on a control signal from the control circuit 101. Furthermore, the transmission-type electronic pen 1 of the embodiment includes a writing pressure detecting module 7 described below as pressure detector that detects the pressure applied to a core body (pen core). In this example, the writing pressure detecting module 7 is formed of a variable-capacitance capacitor that presents capacitance according to the pressure (writing pressure) applied to the core body of the transmission-type electronic pen 1 (for example, see Japanese Patent No. 2011-186803).

FIG. 3A is a diagram showing an example of the control signal from the control circuit 101 of the transmission-type electronic pen 1. As shown in FIG. 3B, in a certain period during which the high level is kept, the transmission-type electronic pen 1 continuously transmits a transmission signal from the transmission circuit 102 as a burst signal (continuous transmission period in FIG. 3C).

The length of the continuous transmission period is set to time length with which an indicated position on the sensor 202 by the transmission-type electronic pen 1 can be detected in the pen indication detecting circuit 203 of the position detecting device 201. For example, the length is set to a time length during which all of the first conductors 211Y and the second conductors 212X can be scanned one or more times, preferably plural times or more.

In the continuous transmission period, the control circuit 101 of the transmission-type electronic pen 1 detects the writing pressure applied to the core body thereof as a detection signal according to the capacitance of the variable-capacitance capacitor of the writing pressure detecting module 7, and obtains the writing pressure as a 10-bit value (binary code) for example, from the detection signal.

Then, as shown in FIG. 3A, when the continuous transmission period ends, the control circuit 101 of the transmission-type electronic pen 1 carries out ASK (Amplitude Shift Keying) modulation of the transmission signal from the transmission circuit 102 by controlling the control signal to the high level or low level at a predetermined cycle (Td). At this time, the control circuit 101 invariably sets the control signal to the high level in the first round of the predetermined cycle (Td) and employs it as a start signal in FIG. 3C. The start signal is a timing signal for allowing the subsequent data transmission timing to be accurately determined on the side of the position detecting device 201. It is also possible to utilize a burst signal as the timing signal instead of the start signal.

The transmission-type electronic pen 1 sequentially transmits writing pressure data of 10 bits subsequently to the start signal. In this case, the transmission-type electronic pen 1 carries out control such that the control signal is set to the low level and the transmission signal is not sent out when the transmission data (binary code) is "0" and the control signal is set to the high level and the transmission signal is sent out when the transmission data (binary code) is "1." In FIGS. 3A-3C, the case in which the writing pressure data to be transmitted is shown to be "1010111010." Subsequently to the writing pressure data, the transmission-type electronic pen 1 sends out data of its own identification information, the remaining battery level, and so forth as an ASK signal or an OOK (On Off Keying) signal similar to the above description. The transmission-type electronic pen 1 repeatedly transmits the signal of the pattern composed of the continuous transmission period and the transmission period of the digital data like the above-described periods at a cycle based on control from the control circuit 101.

In the pen indication detecting circuit 203 of the position detecting device 201, first the control circuit 220 supplies a selection signal to the selection circuit 221 to sequentially select the second conductors $212X_1$ to $212X_n$, for example. Furthermore, when each of the second conductors $212X_1$ to $212X_n$ is selected, the control circuit 220 reads a data output from the AD conversion circuit 226 as a signal level. Then, if the signal level of none of the second conductors $212X_1$ to $212X_n$ reaches a predetermined value, the control circuit 220 determines that the transmission-type electronic pen 1 is not present on the sensor 202, and repeats the control to sequentially select the second conductors $212X_1$ to $212X_n$.

If a signal at a level equal to or higher than the predetermined value is detected from any of the second conductors $212X_1$ to $212X_n$, the control circuit 220 stores the number of the second conductor 212X from which the highest signal level is detected and plural second conductors 212X around it. Then, the control circuit 220 controls the selection circuit 221 to sequentially select the first conductors $211Y_1$ to $211Y_m$, and reads the signal level from the AD conversion circuit 226. At this time, the control circuit 220 stores the numbers of the first conductor 211Y from which the highest signal level is detected and plural first conductors 211Y around it.

Then, the control circuit 220 detects a position on the sensor 202 indicated by the transmission-type electronic pen 1 from the number of the second conductor 212X and the number of the first conductor 211Y from which the highest signal level is detected and the plural second conductors 212X and the plural first conductors 211Y around them, stored in the above-described manner.

After selecting the last first conductor $211Y_m$ by the selection circuit 221 and ending the detection of the signal level, the control circuit 220 waits for the end of the continuous transmission period from the transmission-type electronic pen 1. When detecting a start signal after the end of the continuous transmission period, the control circuit 220 carries out operations of reading writing pressure data and so forth and sends out the read writing pressure data, its own identification information, the remaining battery level, and so forth as an ASK signal or an OOK (On Off Keying) signal as described above. Then, the control circuit 220 repeats the above operation.

[Mechanical Configuration of Transmission-type Electronic Pen 1 of Embodiment]

FIGS. 4A and 4B are diagrams showing the mechanical configuration of the transmission-type electronic pen 1 in accordance with an embodiment. FIG. 4A is obtained by removing part of a case 2 (casing) of the transmission-type electronic pen 1 and showing the inside thereof. Furthermore, FIG. 4B is an enlarged sectional view showing the internal configuration of the pen tip side, which is not shown in FIG. 4A.

The transmission-type electronic pen 1 includes the case 2 that forms a casing formed into a circular tubular shape elongated in the axial center direction. The case 2 is composed of a case main body 21 and a front cap 22 and a rear cap 23 joined to the case main body 21. The case main body 21 and the front cap 22 are composed of an electrically-conductive material, specifically aluminum in this example. The rear cap 23 is composed of a non-electrically-conductive material, specifically an insulating resin in this example.

At the end part of the front cap 22 on the pen tip side, a pen tip guard member 24 composed of an insulating material is fitted and arranged. A core body 4 is composed of an electrically-conductive material, specifically a resin into which metal powders are mixed in this example. As shown in FIG. 4B, the core body 4 is inserted into a through-hole 24a of the pen tip guard member 24 from an opening 1a and is in a state of being freely movable in the axial center direction.

In the hollow part of the case 2, a board holder 3, a battery 5, and a core body holder 6 are housed as shown in FIGS. 4A and 14B.

The board holder 3 is composed of an insulating resin (specifically a liquid crystal polymer, for example) and includes a holding part (hereinafter referred to as holding part for components for pressure sensing) 3a for the writing pressure detecting module 7 as an example of pressure detector and a printed board placement base 3b. The position of the board holder 3 is restricted so that the board holder 3 may be prevented from moving to the side of the core body 4 in the axial center direction in the case 2.

A terminal conductor 51 that electrically abuts against a positive terminal 5a of the battery 5 is provided at the end part of the printed board placement base 3b on the side of the rear cap 23. This terminal conductor 51 is electrically connected to a copper foil pattern of a power supply line of a printed board 8. Furthermore, as shown in FIG. 4A, at the press-fitting part of the rear cap 23 into the case main body 21, a coil spring terminal 52 (that is composed of an electrically-conductive metal that is electrically connected to a negative terminal 5b of the battery 5 and is connected to an earth conductor of the printed board 8) is arranged. The earth conductor of the printed board 8 is not connected to the case main body 21 and the front cap 22.

In this embodiment arranged on the printed board 8 are the transmission circuit 102 that generates a signal to be sent out from the core body 4 of the transmission-type electronic pen 1, the control circuit 101 that controls activation and the transmission operation state of this transmission circuit 102, and so forth, and peripheral circuit components thereof Furthermore, in this embodiment, the case main body 21 and the front cap 22, which are composed of an electrically-conductive material, are electrically connected to the control circuit 101. The control circuit 101 detects the state in which a user is in contact with the case main body 21 or the front cap 22, which is an electrical conductor, with a hand or finger and holds it by a so-called capacitive touch detection method as described below.

The core body holder 6 is composed of an electrically-conductive material and has a shape in which a housing fitting part 61 in which an electrically-conductive elastic member 9 composed of electrically-conductive rubber is fitted and housed and a bar-shaped part 62 fitted to the writing pressure detecting module 7 are monolithically formed, for example. The core body 4 is fitted to and held by the core body holder 6 with the intermediary of the electrically-conductive elastic member 9 but is configured to withdrawn from the core body holder part 6 through pulling by a predetermined force. The bar-shaped part 62 of the core body holder 6 is fitted to a holding member 73 described below in the writing pressure detecting module 7 in the holding part 3a for components for pressure sensing in the board holder 3.

A coil spring 13 composed of an electrically-conductive material, such as an electrically-conductive metal, is mounted on the bar-shaped part 62 of the core body holder 6, and the core body holder 6 is configured to be always biased to the side of the core body 4 relative to the board holder 3 by the coil spring 13.

Furthermore, in this embodiment, for the board holder 3, a member for an electrical connection is formed by a conductor terminal member 14 arranged to straddle the holding part 3a for components for pressure sensing and the coil spring 13 composed of an electrically-conductive material. By this member for an electrical connection, an electrical connection for signal supply from the transmission circuit 102 of the printed board 8 is realized (see FIG. 4B). As shown in FIG. 4B, the conductor terminal member 14 is composed of an abutting plate part 141 (against which one end of the coil spring 13 abuts) and an extending part 142 for connecting the abutting plate part 141 and a copper foil part connected to a signal supply terminal of the transmission circuit 102 of the printed board placement base 3b across the part of the holding part 3a for components for pressure sensing in the board holder 3. A signal from the transmission circuit 102 is supplied to the core body 4 inserted and fitted into the electrically-conductive elastic member 9 via the conductor terminal member 14, the coil spring 13, the core body holder 6, and the electrically-conductive elastic member 9.

The writing pressure detecting module 7 of this example is configured with a variable-capacitance capacitor whose capacitance changes according to the writing pressure applied to the core body 4. The writing pressure detecting module 7 in this embodiment is formed by using a well-known variable-capacitance capacitor described in Japanese Patent Publication No. 2011-186803, for example.

Components for pressure sensing that form the writing pressure detecting module 7 of this example are composed of plural components including a dielectric 71, a terminal member 72, the holding member 73, an electrically-conductive member 74, and an elastic member 75, as shown in FIG. 4B. The holding part 3a for components for pressure sensing in the board holder 3 is formed of a tubular body 32 having a hollow part 31 as shown in FIG. 4B, and the components for pressure sensing that form the writing pressure detecting module 7 are lined up in the axial center direction and are housed in the hollow part 31. A wall part 33 is formed between the holding part 3a for components for pressure sensing and the board holder part 3b in the board holder 3.

The variable-capacitance capacitor formed as the writing pressure detecting module 7 of this example is formed by sandwiching the dielectric 71 between the terminal member 72 that forms one electrode of the variable-capacitance capacitor and the electrically-conductive member 74 that forms the other electrode. The terminal member 72 and the electrically-conductive member 74 are connected to the copper foil pattern of the printed board 8 across the wall part 33.

Furthermore, the holding member 73 that holds the electrically-conductive member 74 is configured to be movable in the axial center direction in the tubular body 32. Moreover, the holding member 73 is always biased to the core body side by the elastic member 75 formed of a coil spring composed of an electrically-conductive material. The electrically-conductive member 74 is electrically connected to the elastic member 75, and one end 75a of the coil spring that forms the elastic member 75 is connected to the copper foil pattern of the printed board 8 as the other electrode of the variable-capacitance capacitor.

In the holding member 73, a recess 73a is made on the same side as the side of the core body 4 in the axial center direction thereof as shown in FIG. 4B. The bar-shaped part 62 of the core body holder 6 is press-fitted into the recess 73a of the member 73 and is engaged so as not to fall off to the side of the core body 4.

When a pressure is applied to the tip part of the core body 4, the core body 4 and the core body holder 6 are displaced towards the rear cap 23 in the axial center direction according to the pressure. Due to this displacement, the holding member 73 in the holding part 3a for components for pressure sensing is displaced in a direction of the dielectric 71 against the elastic biasing force of the elastic member 75. As a result, the electrically-conductive member 74 fitted to the holding member 73 is displaced towards the dielectric 71, so that the distance between the electrically-conductive member 74 and the dielectric 71 and the contact area between the electrically-conductive member 74 and the dielectric 71 change according to the pressure applied to the core body 4. Due to this, the capacitance of the variable-capacitance capacitor that forms the writing pressure detecting module 7 changes according to the pressure applied to the core body 4 such that the change in the capacitance is detected by the control circuit 101 and the writing pressure is detected.

[Operation Control of Transmission-type Electronic Pen 1]

FIG. 5 is a block diagram showing a high level configuration of an electronic circuit of the transmission-type electronic pen 1 in accordance with an embodiment. The configuration is centered around the above-described control circuit 101 and transmission circuit 102. As shown in FIG. 5, the battery 5 is connected to a power supply circuit 103. The source voltage of the transmission-type electronic pen 1 of this embodiment is generated by the power supply circuit 103 and supplied to the control circuit 101 and transmission circuit 102. In this example, the control circuit 101 is formed as an IC (Integrated Circuit).

The transmission circuit 102 internally includes an oscillator (diagrammatic representation is omitted) in this example and generates and outputs a transmission signal based on an oscillation signal of the oscillator. In the example, the transmission signal from the transmission circuit 102 is supplied to the core body 4, which is an electrical conductor, and the transmission signal is transmitted to the position detecting device 201 through the core body 4.

The control circuit 101 includes a microcomputer in this example and controls activation of the transmission operation of the transmission circuit 102 and controls the transmission operation state thereof. In this example, activation of the transmission operation of the transmission circuit 102 includes activation of the built-in oscillator. Furthermore, in the control of the transmission operation state of the transmission circuit of this example, amplitude control of the oscillation signal from the oscillator, control of the intermittence of the oscillation signal, and so forth are performed.

Furthermore, in this embodiment, the control circuit 101 detects contact by a user with the case main body 21 or the front cap 22 as an electrical conductor with a hand or finger as a direct act of the user to the case 2 of the transmission-type electronic pen 1 (serving as a trigger for the start of use of the transmission-type electronic pen 1 by the user) by detecting change in self-capacitance Cx of the case main body 21 and front cap 22 (see FIG. 5).

Here, the self-capacitance Cx of the case main body 21 and the front cap 22 is the capacitance between the case main body 21 and front cap 22 and the earth (ground) and includes floating capacitance. Furthermore, when a human body, such as a hand or finger, makes contact with the case main body 21 or the front cap 22, the human body is connected between the case main body 21 and the front cap 22 and the ground. Due to this, capacitance corresponding to the human body is added to the floating capacitance when the human body is not in contact, and thus the self-capacitance Cx becomes higher. Therefore, the control circuit 101 detects the change in this self-capacitance Cx and, accordingly, detects the contact of the hand or finger of the human body.

For this purpose, in this embodiment, the case main body 21 and the front cap 22, which are an electrical conductor, are electrically connected to a first terminal P1 of the control circuit 101. Furthermore, a capacitor Cr is connected between the first terminal P1 and a second terminal P2 of the control circuit 101 and the second terminal P2 is grounded through a resistor Rc and a capacitor Cc.

In the control circuit 101, the self-capacitance Cx of the case main body 21 and the front cap 22 is measured as follows. Specifically, the control circuit 101 sets the second terminal P2 to the high level to accumulate a charge in the capacitor Cc, and thereafter sets the second terminal P2 to high impedance to keep the charge in the capacitor Cc.

Next, the control circuit 101 sets the first terminal P1 and the second terminal P2 to the low level to discharge part of the charge in the capacitor Cc through the resistor Rc while discharging all of charges in the self-capacitance Cx and the capacitor Cr.

Next, the control circuit 101 sets the first terminal P1 and the second terminal P2 to high impedance to move the charge in the capacitor Cc to the self-capacitance Cx and the capacitor Cr. Then, the control circuit 101 compares the voltage across the self-capacitance Cx between the first terminal P1 and the earth and a reference voltage and determines whether the voltage across the self-capacitance Cx is higher than the reference voltage. Thereby, the control circuit 101 detects contact of the hand or finger of the human body with the case main body 21 or the front cap 22.

Furthermore, the control circuit 101 monitors the capacitance Cv of a variable-capacitance capacitor 7C formed of the writing pressure detecting module 7 and determines whether the capacitance Cv of the variable-capacitance capacitor 7C has become higher than a predetermined reference capacitance. Thereby, the control circuit 101 detects that a pressure is applied to the tip of the core body 4. For this purpose, in this embodiment, a third terminal P3 of the control circuit 101 is connected to ground through the variable-capacitance capacitor 7C and is connected to ground through a resistor Rv.

Furthermore, the control circuit 101 carries out the following operation during the continuous transmission period in described with reference to FIGS. 3A-3C and detects the capacitance Cv of the variable-capacitance capacitor 7C. Specifically, first the control circuit 101 sets the third terminal P3 to the high level to charge the variable-capacitance capacitor 7C. Thereafter, the control circuit 101 sets the third terminal P3 to high impedance to discharge the variable-capacitance capacitor 7C through the resistor Rv. Thereupon, the potential of the third terminal P3, i.e., the voltage across the variable-capacitance capacitor 7C, gradually decreases. The time until the voltage across the variable-capacitance capacitor 7C becomes the predetermined reference voltage depends on the capacitance Cv of the variable-capacitance capacitor 7C.

Therefore, the control circuit 101 obtains the capacitance Cv of the variable-capacitance capacitor 7C by measuring the time until the voltage across the variable-capacitance capacitor 7C becomes the predetermined reference voltage. Then, from a change in the obtained capacitance Cv, the control circuit 101 determines whether a pressure is being applied to the core body 4 of the transmission-type electronic pen 1.

Furthermore, in this embodiment, the control circuit 101 carries out activation control and control of the transmission operation state for the transmission circuit 102 of the transmission-type electronic pen 1 based on whether a hand or finger of a human body has made contact with the case main body 21 or the front cap 22 as an electrical conductor and whether a pressure is being applied to the core body 4 of the transmission-type electronic pen 1.

Figure 6:
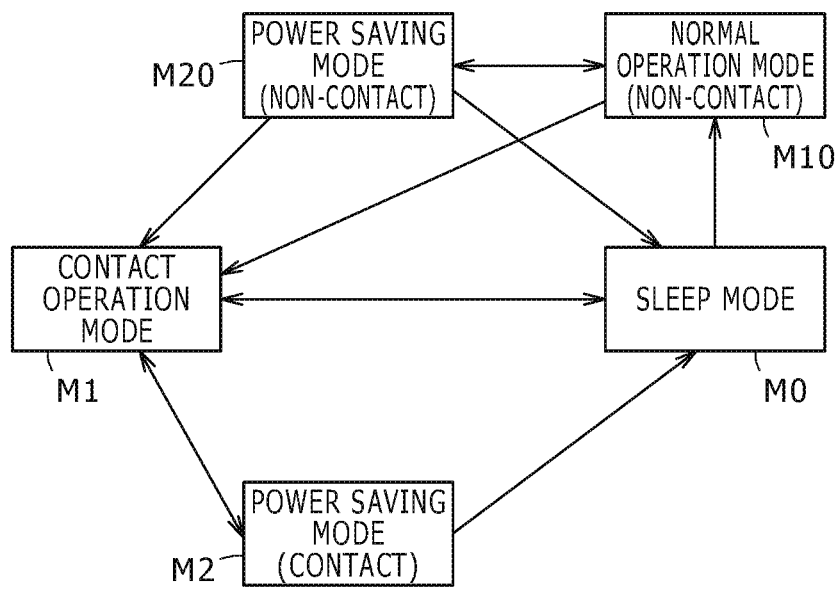
FIG. 6 is a diagram showing transition of a transmission operation state in power saving control in the first embodiment of the transmission-type electronic pen.

FIG. 6 is a diagram for showing mode transition based on control of activation and the transmission operation state of the transmission circuit 102 by the control circuit 101 in the transmission-type electronic pen 1 of the first embodiment.

In FIG. 6, in a sleep mode M0, the transmission circuit 102 is not activated and is not transmitting a signal.

In a contact operation mode M1 the transmission circuit 102 is in the normal transmission operation state in which a user holds the transmission-type electronic pen 1 with a hand or fingers in order to use the transmission-type electronic pen 1 and the hand or finger of the human body is in contact with the case main body 21 or the front cap 22 as the electrical conductor.

In a power saving mode (contact) M2 the transmission circuit 102 is in a transmission operation state with low power consumption in which a user holds the transmission-type electronic pen 1 with a hand or fingers and the hand or finger of the human body is in contact with the case main body 21 or the front cap 22 as an electrical conductor. In this embodiment, in the transmission operation state with low power consumption, the amplitude of the signal from the transmission circuit 102 is set lower than the amplitude of the signal in the normal transmission operation state in the contact operation mode M1. Alternatively, the repetition cycle of the signal in a pattern composed of the continuous transmission period and the transmission period of digital data shown in FIGS. 3A-3C is set longer than the repetition cycle in the normal transmission operation state in the contact operation mode M1.

In a normal operation mode (non-contact) M10, the transmission circuit 102 is in the normal transmission operation state in which a user holds the transmission-type electronic pen 1 with a hand or fingers in order to use the transmission-type electronic pen 1 but the control circuit 101 cannot detect that the hand or finger of the human body is in contact with the case main body 21 or the front cap 22 as an electrical conductor because the user wears a glove, or the like.

In a power saving mode (non-contact) M20, the transmission circuit 102 is in a transmission operation state with low power consumption in which it is impossible to detect that a hand or finger of a human body is in contact with the case main body 21 or the front cap 22 as an electrical conductor because the user wears a glove, or the like. The transmission operation state with low power consumption in the transmission circuit 102 is similar to the power saving mode (contact) M2.

Furthermore, in this embodiment, the control circuit 101 determines whether a hand or finger of a human body is in contact with the case main body 21 or the front cap 22 as an electrical conductor based on change in the self-capacitance Cx of the case main body 21 and the front cap 22 as the electrical conductor. In addition, the control circuit 101 determines whether a pressure is being applied to the core body 4 of the transmission-type electronic pen 1 based on a change in the capacitance Cv of the variable-capacitance capacitor 7C formed of the writing pressure detecting module 7. Based on this, the control circuit 101 controls the transition of the plural modes shown in FIG. 6 regarding the transmission circuit 102 of the transmission-type electronic pen 1.

Figure 7:
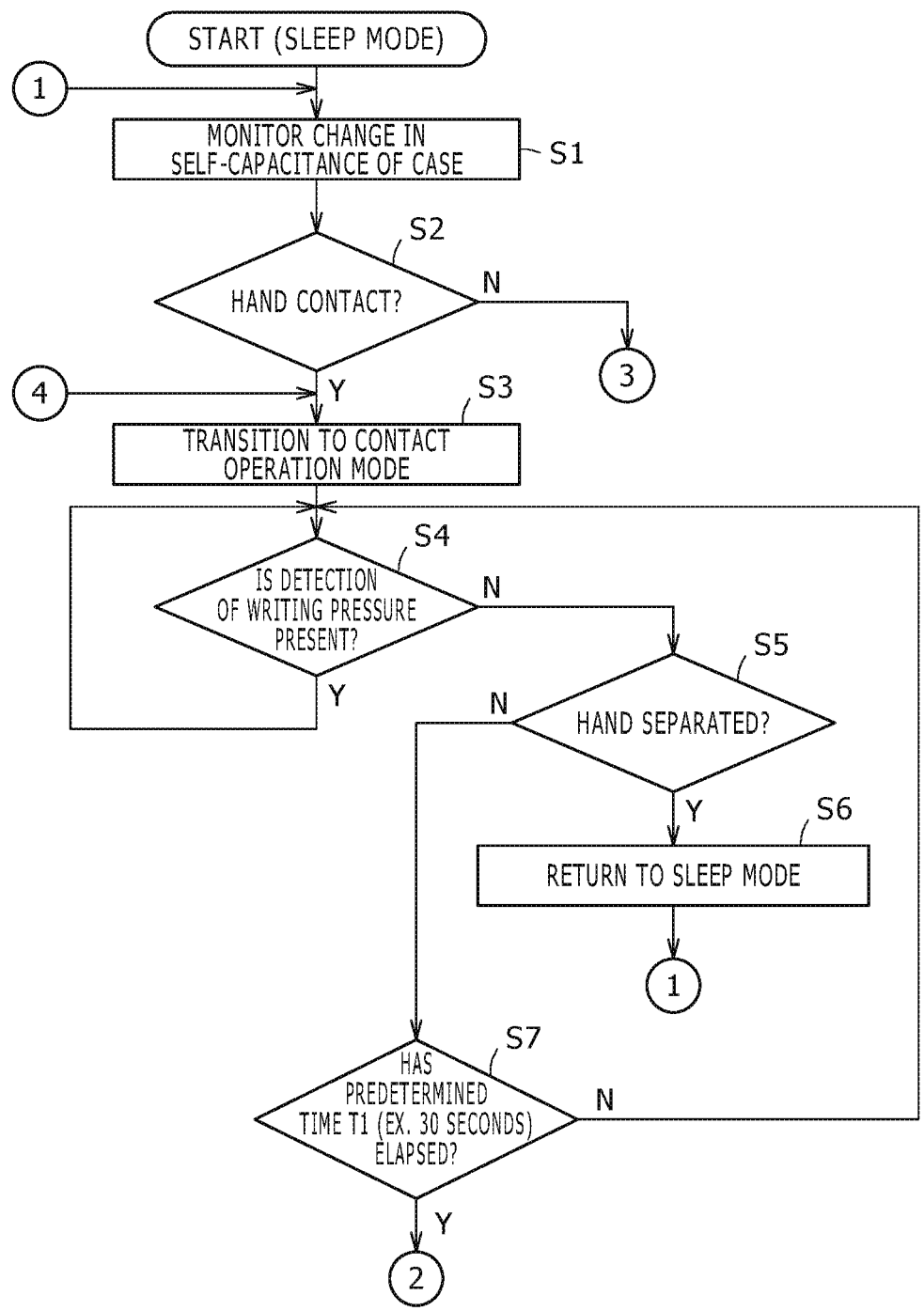
FIG. 7 is a diagram showing part of a flow diagram of operation of the power saving control in the first embodiment of the transmission-type electronic pen.
Figure 8:
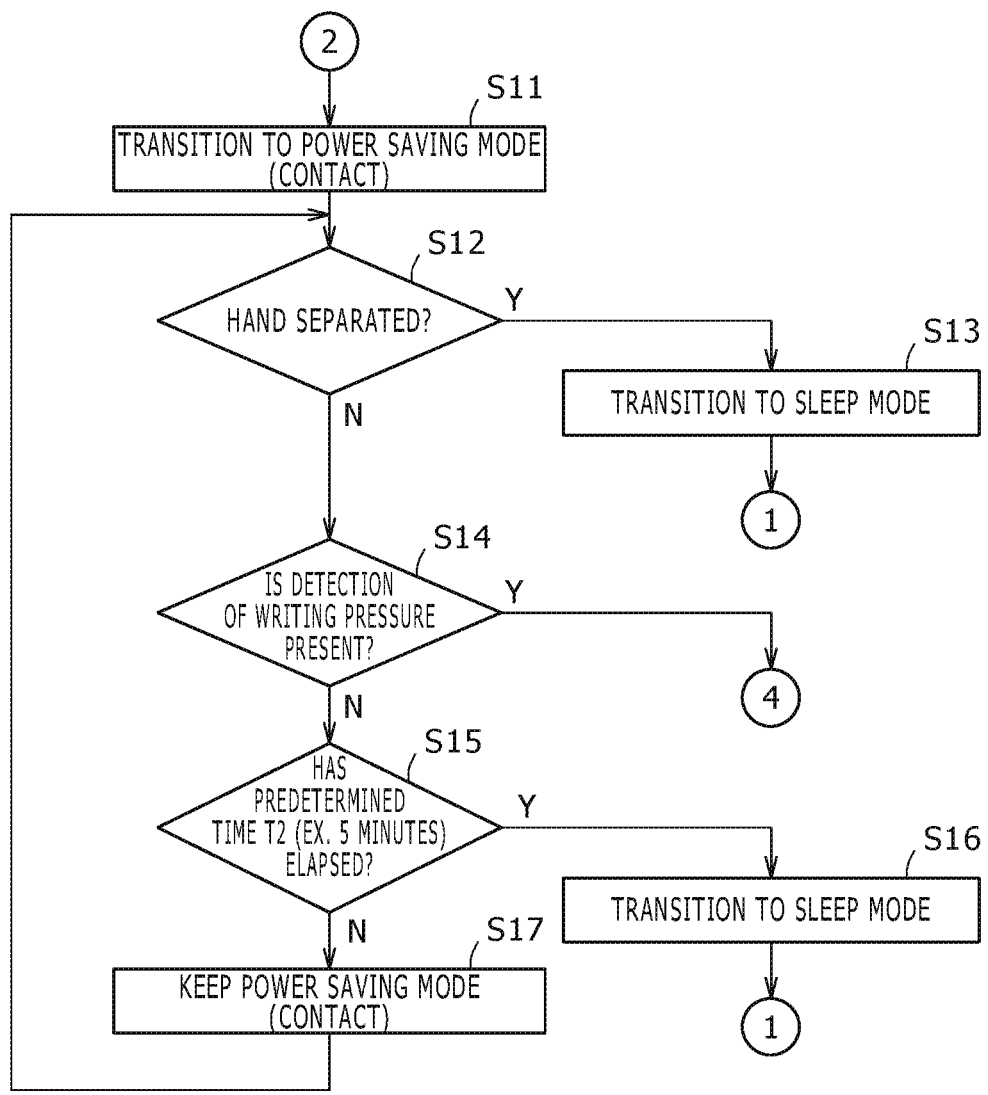
FIG. 8 is a diagram showing part of the flow diagram of the operation of the power saving control in the first embodiment of the transmission-type electronic pen.
Figure 9:
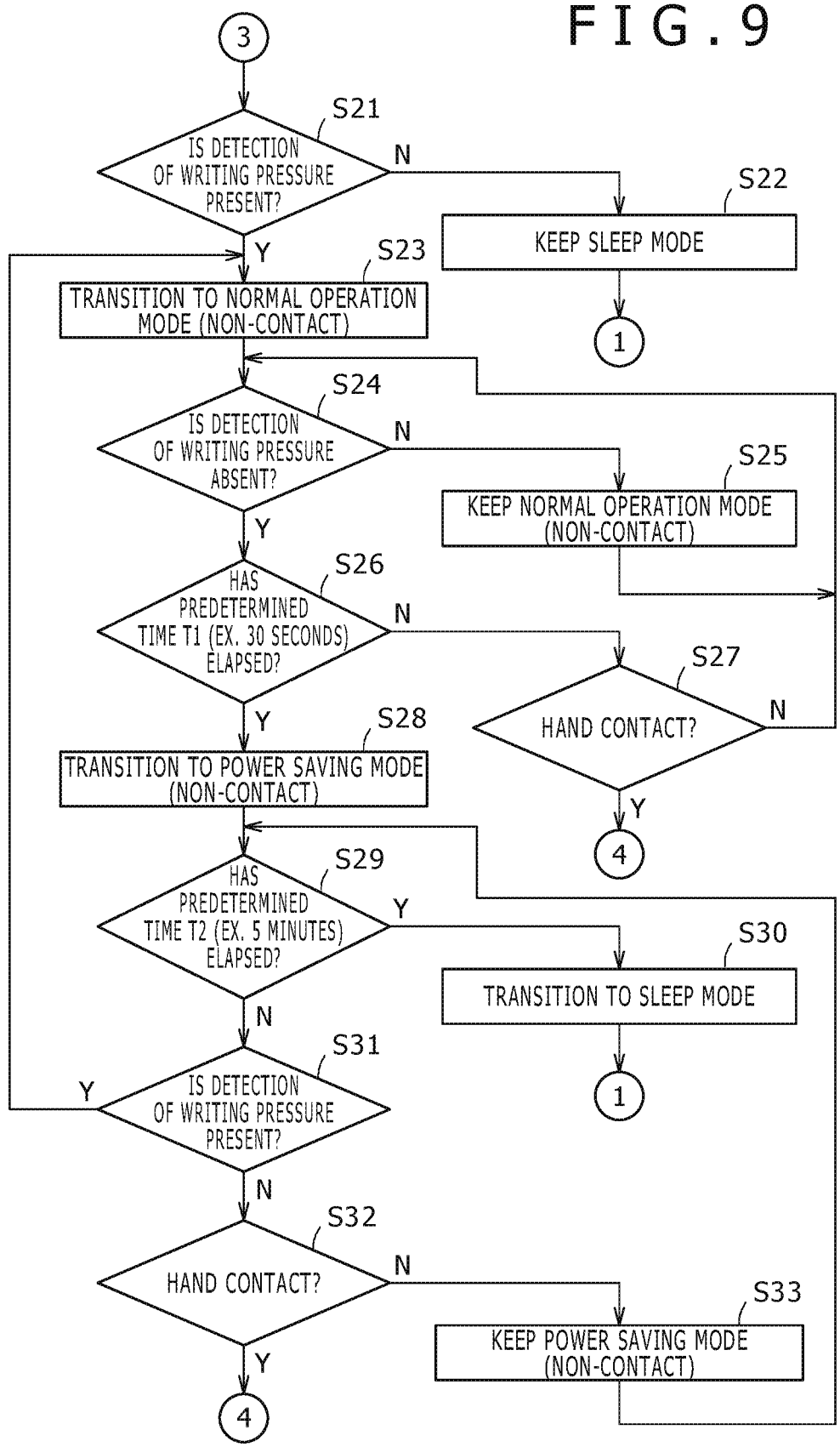
FIG. 9 is a diagram showing part of the flow diagram of the operation of the power saving control in the first embodiment of the transmission-type electronic pen.

FIG. 7 to FIG. 9 are show a flow diagram of a processing operation for mode transition control of the transmission-type electronic pen 1 based on control of the transmission circuit 102 by the control circuit 101. With reference to the flow diagram, the transition control of the plural modes of the transmission-type electronic pen 1 shown in FIG. 6 is described below.

In a state in which a user is not intending to start use of the transmission-type electronic pen 1 and, thus, a hand or finger of a human body is not in contact with the case main body 21 or the front cap 22 as an electrical conductor and a pressure is not applied to the tip of the core body 4, the transmission-type electronic pen 1 is in the sleep mode M0 as a result of control performed by the control circuit 101. In the sleep mode M0, the transmission circuit 102 is not activated and is not transmitting a signal as described above. The flow diagram of FIG. 7 to FIG. 9 starts from the sleep mode M0 state.

In the sleep mode M0, the control circuit 101 monitors change in the self-capacitance Cx of the case main body 21 and the front cap 22 (step S1) and determines whether or not a hand or finger has made contact with the case main body 21 or the front cap 22 (step S2) as described above. When determining, at step S2, that a hand or finger has made contact with the case main body 21 or the front cap 22, the control circuit 101 activates the transmission circuit 102 and carries out control to transition from the sleep mode M0 to the contact operation mode M1 (step S3).

In the contact operation mode M1, the control circuit 101 carries out control to cause the transmission circuit 102 to repeatedly transmit a signal of a pattern, such as the pattern described with reference to FIGS. 3A-3C, with a normal signal amplitude and a normal repetition cycle. The normal signal amplitude and the normal repetition cycle are a signal amplitude and a repetition cycle with which the position detecting device 201 can receive the signal from the transmission-type electronic pen 1 and can detect an indicated position on the sensor 202 thereof by the transmission-type electronic pen 1 surely and relatively rapidly.

Next, in the contact operation mode M1, the control circuit 101 monitors the capacitance Cv of the variable-capacitance capacitor 7C forming the writing pressure detecting module 7 and determines whether or not a writing pressure is being applied to the core body 4 (step S4) as described above. When determining, at step S4, that a writing pressure is being applied to the core body 4, the control circuit 101 repeats step S4 and keeps the contact operation mode M1.

Furthermore, when determining, at step S4, that a writing pressure is not being applied to the core body 4, the control circuit 101 monitors change in the self-capacitance of the case main body 21 and the front cap 22 and determines whether or not the hand or finger has been separated from the case main body 21 or the front cap 22 (step S5). When determining in step S5 that the hand or finger has been separated from the case main body 21 or the front cap 22, the control circuit 101 stops the transmission of the transmission circuit 102 and carries out control to return from the contact operation mode M1 to the sleep mode M0 (step S6). Then, after step S6, the control circuit 101 returns the processing to step S1 and repeats the processing of step S1 and the subsequent steps.

Furthermore, when determining at step S5 that the hand or finger has not been separated from the case main body 21 or the front cap 22, the control circuit 101 determines whether or not the state in which a writing pressure is not applied to the core body 4 has continued for a first predetermined time T1 or longer (step S7). The first predetermined time T1 is a time set in consideration of the fact that even when the core body 4 of the transmission-type electronic pen 1 is separated from the input surface of the sensor 202 of the position detecting device (as a result of user action) and a writing pressure is not applied to the core body 4 (as a result of user action), the user brings the transmission-type electronic pen 1 into contact with the input surface of the sensor 202 again to indicate input after a comparatively-short time. For example, T1 is set to equal 30 seconds.

Then, when determining at step S7 that the state in which a writing pressure is not applied to the core body 4 has not continued for the first predetermined time T1 or longer, the control circuit 101 returns the processing to step S4 and executes the processing of step S4 and subsequent steps.

Furthermore, when determining at the step S7 that the state in which a writing pressure is not applied to the core body 4 has continued for the first predetermined time T1 or longer, the control circuit 101 performs control to transition from the contact operation mode M1 to the power saving mode (contact) M2, in which the transmission operation of the transmission circuit 102 is maintained but the consumption of the battery 5 is reduced (step S11 in FIG. 8). Specifically, in this embodiment, in the power saving mode (contact), the transmission circuit 102 realizes power saving by setting the amplitude of the transmitted signal lower than in the normal transmission operation state or setting the repetition cycle of the signal of the pattern composed of the above-described continuous transmission period and digital data transmission period longer than in the normal transmission operation state as described above.

If the mode is immediately switched to the power saving mode M2 when the state in which a writing pressure is not applied to the core body 4 is obtained without waiting for the elapse of the predetermined time T41, when a user attempts to return the state from the non-contact state of the core body 4 of the relevant transmission-type electronic pen 1 to the contact state of the core body 4 in a short time to carry out position indication, return from the power saving mode M2 to the contact operation mode M1 is necessary in the transmission-type electronic pen 1 and, thus, there is a fear that the response corresponding to the position indication by the transmission-type electronic pen 1 is delayed. However, in this embodiment, a transition is not made from the contact operation mode M1 to the power saving mode M2 during the first predetermined time T1 and, therefore, such a problem in the response can be alleviated.

Next, the control circuit 101 monitors change in the self-capacitance of the case main body 21 and the front cap 22 and determines whether or not the hand or finger has been separated from the case main body 21 or the front cap 22 (step S12). When determining at step S12 that the hand or finger has been separated from the case main body 21 or the front cap 22, the control circuit 101 stops the transmission operation of the transmission circuit 102 and carries out control to transition from the power saving mode (contact) M2 to the sleep mode M0 (step S13). Thereafter, the control circuit 101 returns the processing to step S1 and repeats the processing of step S1 and the subsequent steps.

Furthermore, when determining at step S12 that the hand or finger has not been separated from the case main body 21 or the front cap 22, the control circuit 101 monitors the capacitance Cv of the variable-capacitance capacitor 7C forming the writing pressure detecting module 7 and determines whether or not a writing pressure is being applied to the core body 4 (step S14). Then, when determining at step S14 that a writing pressure is being applied to the core body 4, the control circuit 101 proceeds to step S3 and carries out control to transition from the power saving mode (contact) M2 to the contact operation mode M1.

Moreover, when determining at step S14 that a writing pressure is not being applied to the core body 4, the control circuit 101 determines whether or not the state in which a writing pressure is not applied to the core body 4 has continued for a second predetermined time T2 (T1<T2) or longer (step S15).

Here, the second predetermined time T2 is a time set accounting for the fact when a user is absorbed in thought, or the like, although holding the transmission-type electronic pen 1 with a hand or fingers and it is guessed that the user does not immediately carry out position indication to the input surface of the sensor 202 of the position detecting device 201 by the transmission-type electronic pen 1 and therefore it is preferable to switch the mode to the power saving mode to prevent the draining of the battery 5. For example, T2 may be set to equal five minutes.

Furthermore, when determining at step S15 that the state in which a writing pressure is not applied to the core body 4 has not continued for the second predetermined time T2 or longer, the control circuit 101 keeps the power saving mode (contact) M2 and returns to step S12 to execute the processing of step S12 and the subsequent steps.

When determining at step S15 that the state in which a writing pressure is not applied to the core body 4 has continued for the second predetermined time T2 or longer, the control circuit 101 stops the transmission operation of the transmission circuit 102 and carries out control to transition from the power saving mode (contact) M2 to the sleep mode M0 (step S16). Thereafter, the control circuit 101 returns to step S1 and repeats step S1 and the subsequent steps.

In the above-described manner, in this embodiment, when it is determined that the state in which a writing pressure is not applied to the core body 4 has continued for the second predetermined time T2 or longer, a transition is made from the state of the power saving mode (contact) to the sleep mode M0 and, thus, useless power consumption of the battery 5 can be alleviated.

Furthermore, when determining at step S2 in FIG. 7 that the contact of the hand or finger of the user with the case main body 21 or the front cap 22 based on change in the self-capacitance Cx of the case main body 21 and the front cap 22 has not been detected, the control circuit 101 monitors the capacitance Cv of the variable-capacitance capacitor 7C forming the writing pressure detecting module 7 and determines whether or not a writing pressure is not being applied to the core body 4 (step S21 in FIG. 9).

If a user wears a glove for example and holds the transmission-type electronic pen 1 and brings the core body 4 into contact with the input surface of the sensor 202 of the position detecting device 201 to apply a writing pressure, the contact of a hand or finger of the user with the case main body 21 or the front cap 22 based on change in the self-capacitance of the case main body 21 and the front cap 22 is not detected due to the glove. However, due to the application of the writing pressure to the core body 4, it turns out that position indication is being attempted on the input surface of the sensor 202 of the position detecting device 201 by the relevant transmission-type electronic pen 1. At step S21, it is determined whether use of the transmission-type electronic pen 1 by a user who wears such a glove or the like has started.

When determining at step S21 that a writing pressure is not being applied to the core body 4, the control circuit 101 keeps the sleep mode and returns to step S1.

Furthermore, when determining at step S21 that a writing pressure is applied to the core body 4, the control circuit 101 activates the transmission circuit 102 and carries out control to make a transition from the sleep mode M0 to the normal operation mode (non-contact) M10 (step S23). In the normal operation mode (non-contact) M10 of step S23, the control circuit 101 controls the transmission circuit 102 to cause the transmission circuit 102 to repeatedly transmit a signal of a pattern, such as the pattern described with reference to FIGS. 3A-3C, with the normal signal amplitude and the normal repetition cycle similar to the contact operation mode M1.

Moreover, in this normal operation mode (non-contact) M10, the control circuit 101 monitors the capacitance Cv of the variable-capacitance capacitor 7C forming the writing pressure detecting module 7 and determines whether or not the writing pressure applied to the core body 4 has disappeared (step S24). When determining at step S24 that the writing pressure applied to the core body 4 has not disappeared, the control circuit 101 keeps the normal operation mode (non-contact) M10 (step S25). Then, the control circuit 101 returns to step S24.

When determining at step S24 that the writing pressure applied to the core body 4 has disappeared, the control circuit 101 determines whether or not the state in which a writing pressure is not applied to the core body 4 has continued for the first predetermined time T1 or longer, specifically for 30 seconds or longer for example (step S26). When determining at step S26 that the state in which a writing pressure is not applied to the core body 4 has not continued for the first predetermined time T1 or longer, the control circuit 101 monitors change in the self-capacitance Cx of the case main body 21 and the front cap 22 and determines whether or not a hand or finger has directly made contact with the case main body 21 or the front cap 22 (step S27).

When determining in the step S27 that a hand or finger has not directly made contact with the case main body 21 or the front cap 22, the control circuit 101 returns the processing to step S24. Furthermore, when determining at step S27 that a hand or finger has directly made contact with the case main body 21 or the front cap 22, the control circuit 101 returns the processing to step S3 in FIG. 7 and executes the processing step S3 and subsequent steps.

Furthermore, when determining in the step S26 that the state in which a writing pressure is not applied to the core body 4 has continued for the first predetermined time T1 or longer, the control circuit 101 carries out control to transition from the normal operation mode (non-contact) M10 to the power saving mode (non-contact) M20, in which the transmission operation of the transmission circuit 102 is kept but the consumption of the battery is reduced (step S28). In this power saving mode (non-contact), similar to the case of the above-described power saving mode (contact), the transmission circuit 102 realizes power saving by setting the amplitude of the transmitted signal lower than in the normal transmission operation state or setting the repetition cycle of the signal of the pattern composed of the above-described continuous transmission period and digital data transmission period longer than in the normal transmission operation state.

Next, the control circuit 101 determines whether or not the state in which a writing pressure is not applied to the core body 4 has continued for the second predetermined time T2 or longer, specifically T2=five minutes or longer, for example (step S29). When determining at step S29 that the state in which a writing pressure is not applied to the core body 4 has continued for the second predetermined time T2 or longer, the control circuit 101 stops the transmission operation from the transmission circuit 102 and carries out control to make a transition from the power saving mode (non-contact) M20 to the sleep mode M0 (step S30). Thereafter, the control circuit 101 returns to step S1 and repeats step S1 and subsequent steps.

When determining at step S29 that the state in which a writing pressure is not applied to the core body 4 has not continued for the second predetermined time T2 or longer, the control circuit 101 monitors the capacitance Cv of the variable-capacitance capacitor 7C forming the writing pressure detecting module 7 and determines whether or not a writing pressure is being applied to the core body 4 (step S31). Then, when determining at step S31 that a writing pressure is being applied to the core body 4, the control circuit 101 returns to step S23 and carries out control to transition from the power saving mode (non-contact) M20 to the normal operation mode (non-contact) M10. Thereafter, the control circuit 101 executes step S23 and subsequent steps.

When determining at step S31 that a writing pressure is not being applied to the core body 4, the control circuit 101 monitors change in the self-capacitance Cx of the case main body 21 and the front cap 22 and determines whether or not a hand or finger has directly gotten contact with the case main body 21 or the front cap 22 (step S32).

When determining at step S32 that a hand or finger has not directly gotten contact with the case main body 21 or the front cap 22, the control circuit 101 keeps the power saving mode (non-contact) M20 (step S23) and then returns to step S29 to execute the processing of step S29 and subsequent steps. Furthermore, when determining at step S32 that a hand or finger has not directly made contact with the case main body 21 or the front cap 22, the control circuit 101 returns the processing to the step S3 in FIG. 7 and executes the processing of step S3 and subsequent steps.

[Effects of First Embodiment]

According to the transmission-type electronic pen 1 of the above-described first embodiment, when contact of a hand or finger of a user with the case main body 21 or the front cap 22 composed of a conductor is detected by a detector as a direct act of the user to the case 2, serving as a trigger for the start of use of this transmission-type electronic pen 1, the transmission circuit 102 is activated and is set to the first transmission operation state as the normal transmission operation state in which an indicated position can be surely detected by the position detecting device 201. Thus, when the user intends to start use of the transmission-type electronic pen 1, detection of the hover state of the transmission-type electronic pen 1 by the position detecting device 201 can be allowed to be always possible.

Furthermore, according to the transmission-type electronic pen 1 of this first embodiment, the control circuit 101 can control the transmission operation of the transmission circuit 102 so that further power saving can be achieved, based on a detection output of the detector that detects contact by a hand or finger with the case main body 21 or the front cap 22 as the conductor as a direct act of the user to the case 2, serving as a trigger for the start of use of this transmission-type electronic pen 1, and a writing pressure detection output about whether a writing pressure is being applied to the tip of the core body 4.

Specifically, even in the state in which a user is holding the transmission-type electronic pen 1 of the embodiment, when the state in which a writing pressure is not applied to the transmission-type electronic pen 1 has continued for the first predetermined time T1 or longer according to the writing pressure detection output, useless power consumption can be reduced as much as possible by offering further power saving through decreasing the amplitude of the transmission signal of the transmission circuit 102 or increasing the repetition cycle of the transmission signal of the predetermined pattern. Furthermore, when the state in which a writing pressure is not applied to the transmission-type electronic pen 1 has reached at least the second predetermined time T2 longer than the first predetermined time T1, the mode is switched to the sleep mode in which the transmission of the transmission circuit 102 is stopped and thus further power saving can be achieved.

Moreover, in the above-described first embodiment, even when a user holds the transmission-type electronic pen 1 while wearing a glove, the transmission circuit 102 is activated based on the writing pressure detection output. Thus, use of the transmission-type electronic pen 1 can be ensured even when contact with the case main body 21 or the front cap 22 cannot be detected. Furthermore, in this embodiment, also when a glove is worn, the transmission operation state of the transmission circuit is controlled in the above-described manner according to the result of comparison between the continuation time of the state in which contact of the transmission-type electronic pen 1 with the sensor surface is not detected based on the writing pressure detection output and the first predetermined time T1 and the second predetermined time T2. Thus, in the transmission-type electronic pen 1, useless power consumption can be reduced as much as possible.

Furthermore, in the above-described embodiment, after a writing pressure is detected once, even when the transmission-type electronic pen 1 is separated from the surface of the sensor 202 of the position detecting device 201 and the detection of the writing pressure becomes absent, the transmission circuit 102 continues the transmission operation until the predetermined time T1 elapses in the state in which the detection of the writing pressure is absent. In addition, in the above-described first embodiment, after the elapse of the first predetermined time T1, the transmission of the transmission circuit 102 is not immediately stopped and a transition is made to the power saving mode in which the transmission state is at such a degree that the hover state of the transmission-type electronic pen 1 over the surface of the sensor 202 of the position detecting device 201 can be detected. Then, the transmission state of the transmission circuit 102 is stopped when the state in which the detection of the writing pressure is absent further continues for at least the second predetermined time T2 longer than the first predetermined time T1.

Compared with the case in which the transmission of the transmission circuit 102 is immediately stopped when the state in which detection of a writing pressure is absent continues for the predetermined time or longer, in the case of the above-described first embodiment, the mode is controlled to two stages with the intermediary of the power saving mode and thus there are merits that power saving control can be carried out more finely and that the response of detection in the position detecting device 201 for a position indication on the surface of the sensor 202 of the position detecting device 201 by the transmission-type electronic pen 1 becomes favorable also because detection of the hover state in the power saving mode is possible.

In the state when detection of a writing pressure becomes absent, there is not only the case in which the user immediately inputs position indication again by the transmission-type electronic pen 1 but also the case in which the user releases the transmission-type electronic pen 1 from a hand and does not immediately input position indication again. However, according to the above-described embodiment, both cases are discriminated and useless power consumption can be reduced as much as possible while the original function of position indication by the transmission-type electronic pen 1 is favorably kept.

Furthermore, in the above-described embodiment, detection of contact of a human body, which is an electrical conductor, with the case main body 21 or the front cap 22 is carried out by detecting change in the self-capacitance Cx of the case main body 21 and the front cap 22, which are an electrical conductor. Therefore, transmission and reception of a signal as in the case of detecting mutual capacitance are unnecessary and there is an effect that this configuration is suitable also for power saving.

[Modification Example of First Embodiment]

In the above-described first embodiment, when determining that a hand or finger of a user has made contact with the case main body 21 or the front cap 22, the control circuit 101 transitions from the sleep mode M0 to the contact operation mode M1 and causes the transmission circuit 102 to carry out transmission in the normal operation state. However, when determining that a hand or finger of a user has made contact with the case main body 21 or the front cap 22, the control circuit 101 may transition from the sleep mode M0 to the power saving mode (contact) M2 and, thereafter, may carry out control to make a transition from the power saving mode (contact) M2 to the contact operation mode M1 when determining that a writing pressure is applied to the core body 4 in the power saving mode (contact) M2. Also in this case, in the power saving mode (contact) M2, the transmission circuit 102 is in the transmission operation state that allows detection of the hover state of the transmission-type electronic pen 1 by the position detecting device. Therefore, it is possible the detection of the hover state of the transmission-type electronic pen 1 by the position detecting device can be always possible when a user intends to start use.

Furthermore, in the above-described example, one stage of the power saving mode is employed. However, the power saving mode may be set at plural stages having different degrees of power savings. It goes without saying that the sleep mode is the mode in which transmission is stopped and, therefore, is a mode of power saving.

Moreover, in the above-described example, when the state in which a writing pressure is not applied to the transmission-type electronic pen 1 has reached at least the first predetermined time T1 in the contact operation mode M1 or the normal operation mode M10, a transition is made to the power saving mode M2 or M20. Furthermore, when the second predetermined time T2 or longer elapses, a transition is made from the power saving mode M2 or M20 to the sleep mode M0. However, when the predetermined time or longer elapses in the state in which a writing pressure is not applied to the transmission-type electronic pen 1 in the contact operation mode M1 or the normal operation mode M10, a transition may be made directly to the sleep mode M0 without going through the power saving mode M2 or M20.

Second Embodiment

In the above-described first embodiment, only contact of a human body such as a hand or finger of a user with the case main body 21 or the front cap 22 is detected as a direct act of the user to the case 2 of the transmission-type electronic pen 1, serving as a trigger for the start of use of the transmission-type electronic pen. However, not only contact of a human body such as a hand or finger of a user with the case main body 21 or the front cap 22 but the motion of the transmission-type electronic pen 1 due to an act such as raising after holding by a user may be detected in combination as a direct act of the user to the case 2 of the transmission-type electronic pen 1, serving as a trigger for the start of use of the transmission-type electronic pen.

Figure 10:
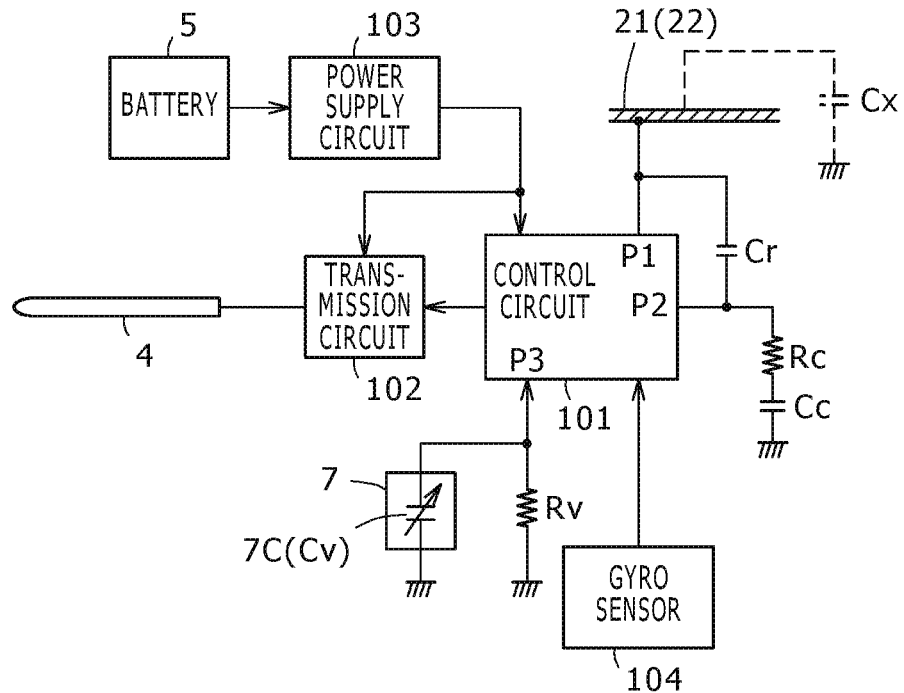
FIG. 10 shows an example configuration of an electronic circuit of a second embodiment of the transmission-type electronic pen.

FIG. 10 is a block diagram of a high level configuration of an electronic circuit of a transmission-type electronic pen 1A of the second embodiment. The mechanical structure of the transmission-type electronic pen 1A of this second embodiment is the same as the above-described first embodiment. In the second embodiment, a gyro sensor 104 is arranged to be placed on the printed board 8 in the case 2 in order to detect the motion of the case 2 of the transmission-type electronic pen 1A. Furthermore, as shown in FIG. 10, the gyro sensor 104 is connected to the control circuit 101 and is configured to supply a motion detection output thereof to the control circuit 101.

Moreover, in the second embodiment, the control circuit 101 does not make a transition from the sleep mode M0 to the contact operation mode M1 in response to only contact of a user with the case main body 21 or the front cap 22 with a hand or finger. The control circuit 101 carries out control to transition from the sleep mode M0 to the contact operation mode M1 when the motion of the case 2 of the transmission-type electronic pen 1A is detected based on the motion detection output of the gyro sensor 104 in addition to the above-described contact of a hand or finger.

Furthermore, in the second embodiment, even in the state in which contact of a hand or finger with the case main body 21 or the front cap 22 by a user has not been detected, the control circuit 101 carries out control to transition from the sleep mode M0 to the normal operation mode (non-contact) M10 when detecting the motion of the case 2 of the transmission-type electronic pen 1A based on the motion detection output of the gyro sensor 104. Therefore, in the second embodiment, when a user wears a glove and intends to start position indication while holding the transmission-type electronic pen 1A, the hover state of the transmission-type electronic pen 1A over the sensor of the position detecting device can be detected.

Moreover, in the second embodiment, the control circuit 101 considers the motion detection output of the gyro sensor 104 in combination with a transition from the contact operation mode M1 to the power saving mode (contact) M2 and a transition from the normal operation mode (non-contact) M10 to the power saving mode (non-contact) M20. Specifically, in this second embodiment, even when the predetermined time T1 or longer elapses in the state in which detection of a writing pressure is absent, the control circuit 101 deems that an intention of the user to carry out position indication exists and does not make a transition to the power saving mode (contact) M2 or the power saving mode (non-contact) M20 when determining that the transmission-type electronic pen 1A is moving based on the motion detection output of the gyro sensor 104. That is, the control circuit 101 carries out a transition from the contact operation mode M1 to the power saving mode (contact) M2 or a transition from the normal operation mode (non-contact) M10 to the power saving mode (non-contact) M20 when determining that a predetermined time T1' or longer has elapsed in the state in which both of the detection output in the state in which detection of a writing pressure is absent and the state in which the transmission-type electronic pen 1A is not moving based on the motion detection output of the gyro sensor 104 are satisfied. In this case, the predetermined time T1' may be the same as the above-described predetermined time T1 or may be made different.

Furthermore, in the second embodiment, also in a transition from the power saving mode (contact) M2 or the power saving mode (non-contact) M20 to the sleep mode M0, the motion detection output of the gyro sensor 104 is also referenced similarly to the cases of a transition from the contact operation mode M1 to the power saving mode (contact) M2 and a transition from the normal operation mode (non-contact) M10 to the power saving mode (non-contact) M20.

In the above-described manner, according to the second embodiment, mode transition is controlled while considering the motion of the case 2 of the transmission-type electronic pen 1A. This enables power saving control while considering an intention to use the transmission-type electronic pen 1A by the user.

[Modification Example of Second Embodiment]

In the above-described second embodiment, the control circuit 101 makes a transition from the sleep mode M0 to the contact operation mode M1 based on detection of not only contact of a human body, such as a hand or finger of a user with the case main body 21 or the front cap 22, but the motion of the transmission-type electronic pen 1 due to an act such as raising after holding by the user in combination. However, the following way may be employed.

Specifically, the control circuit 101 may not make a transition to the contact operation mode M1 but may make a transition to the power saving mode (contact) M2 when determining that a human body, such as a hand or finger of a user, has made contact with the case main body 21 or the front cap 22. Then, the control circuit 101 makes a transition from the power saving mode (contact) M2 to the contact operation mode M1 when detecting the motion of the transmission-type electronic pen 1 based on the motion detection output of the gyro sensor 104.

Furthermore, the control circuit 101 does not transition to the normal operation mode (non-contact) M10 but transitions to the power saving mode (non-contact) M20 when determining that the transmission-type electronic pen 1 has moved based on the motion detection output of the gyro sensor 104 without determining that a human body, such as a hand or finger of a user, has made contact with the case main body 21 or the front cap 22 in the sleep mode M0. Then, the control circuit 101 makes a transition from the power saving mode (non-contact) M20 to the normal operation mode (non-contact) when detecting application of a writing pressure.

This can achieve further power saving. Furthermore, in the power saving mode (contact) M2 and the power saving mode (non-contact) M20, the transmission signal of the transmission circuit 102 is in such a state that the hover state of the transmission-type electronic pen 1A can be detected by the position detecting device. Thus, also in this modification example of the second embodiment, the user can enjoy the effect that the hover state of the transmission-type electronic pen 1A can be always detected by the position detecting device.

In the above-described second embodiment, the gyro sensor 104 is used as a unit for motion detection. However, an acceleration sensor or a geomagnetic sensor may be used instead of the gyro sensor. Furthermore, the gyro sensor, acceleration sensor, and geomagnetic sensor may be used in combination.

Third Embodiment

In a third embodiment, the control circuit 101 detects only the motion of the transmission-type electronic pen 1 due to an act, such as raising the transmission-type electronic pen 1 after holding it by a user, without detecting contact of a human body such as a hand or finger of the user as a direct act of the user to the case 2 of the transmission-type electronic pen 1, serving as a trigger for the start of use of the transmission-type electronic pen.

The mechanical structure of a transmission-type electronic pen 1A of the third embodiment is the same as that of the above-described first embodiment. Furthermore, the configuration of the electronic circuit of the major part of the transmission-type electronic pen of the third embodiment is a configuration obtained by omitting the detecting circuit part for contact of a hand or finger of a user with the case main body 21 or the front cap 22 for the control circuit 101 in FIG. 10 and, therefore, diagrammatic representation thereof is omitted here.

Figure 11:
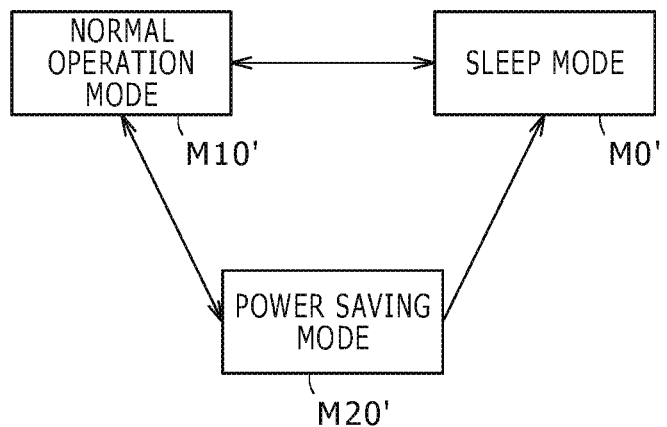
FIG. 11 is a diagram showing transition of a transmission operation state in power saving control in a third embodiment of the transmission-type electronic pen.

Furthermore, in the third embodiment, there is no need to discriminate between the contact operation mode M1 and the normal operation mode (non-contact) M10. Furthermore, there is no need to discriminate between the power saving mode (contact) and the power saving mode (non-contact) M20. Therefore, mode transition is as shown in FIG. 11. In FIG. 11, a sleep mode M0' is in the same state as the above-described sleep mode M0. Furthermore, a normal operation mode M10' is in the same state as the above-described normal operation mode (non-contact) M10. Moreover, a power saving mode M20' is in the same state as the above-described power saving mode (non-contact) M20. The mode transition among them is different from the above-described embodiment.

In the third embodiment, when detecting the motion of the case 2 of the transmission-type electronic pen based on the motion detection output of the gyro sensor 104 in the sleep mode M0, the control circuit 101 carries out control to transition from the sleep mode M0' to the normal operation mode M10'. In the third embodiment, when detecting predetermined magnitude of motion based on the motion detection output of the gyro sensor 104, the control circuit 101 immediately detects that the case 2 of the transmission-type electronic pen has moved. On the other hand, the control circuit 101 detects that the case 2 of the transmission-type electronic pen is not moving when the control circuit 101 has not detected the predetermined magnitude of motion continuously for a predetermined time, specifically 30 seconds, for example, based on the motion detection output of the gyro sensor 104.

When determining that the case 2 of the transmission-type electronic pen is not moving in the normal operation mode M10', the control circuit 101 transitions from the normal operation mode M10' to the sleep mode M0'. Then, the control circuit 101 transitions from the normal operation mode M10' to the power saving mode M20' when determining in the normal operation mode M10' that the state in which a writing pressure cannot be detected continues for the predetermined time T1 (for example, 30 seconds) or longer although the case 2 of the transmission-type electronic pen is moving.

When detecting that the case 2 of the transmission-type electronic pen is not moving in the power saving mode M20', the control circuit 101 transitions from the power saving mode M20' to the sleep mode M0'. Furthermore, also when determining that the state in which a writing pressure cannot be detected continues for the predetermined time T2 (for example, five minutes) or longer although the case 2 of the transmission-type electronic pen is moving in the power saving mode M20', the control circuit 101 transitions from the power saving mode M20' to the sleep mode M0'. Then, the control circuit 101 transitions from the power saving mode M20' to the normal operation mode M10' when determining that the case 2 of the transmission-type electronic pen is moving and a writing pressure can be detected in the power saving mode M20'.

Also in the third embodiment, detection of the hover state of the transmission-type electronic pen 1 by the position detecting device can be allowed to be always possible when the user intends to start use. Furthermore, according to the transmission-type electronic pen of the third embodiment, the control circuit 101 can control the transmission operation of the transmission circuit 102 to achieve further power saving based on the detection output of the motion of the case 2 of the transmission-type electronic pen as a direct act of a user to the casing, serving as a trigger for the start of use of the transmission-type electronic pen, and writing pressure detection output about whether a writing pressure is being applied to the tip of the core body 4.

Moreover, in the third embodiment, the transmission circuit 102 is activated based on the motion detection output of the case 2 also when a user holds the transmission-type electronic pen 1 while wearing a glove. Thus, the position detecting device can detect also the hover state of the transmission-type electronic pen and can carry out power saving control so that useless power consumption can be reduced as much as possible.

[Other Embodiments]

Fourth Embodiment

The method for detecting contact of a hand or finger of a user with the case main body 21 or the front cap 22 of the transmission-type electronic pens 1 and 1A in the above-described first and second embodiments is a method in which change in the self-capacitance Cx of the case main body 21 and the front cap 22 composed of a conductor is detected. The change in this self-capacitance Cx is according to the contact area of the hand or fingers of the user to the case main body 21 and the front cap 22.

Regarding the state of holding of the transmission-type electronic pen by the user, when the user intends to tightly hold the transmission-type electronic pen and carry out position indication, the contact area of a hand or fingers of the user to the case main body 21 and the front cap 22 becomes large. On the other hand, when the user merely picks up the transmission-type electronic pen, the contact area of a hand or fingers of the user to the case main body 21 and the front cap 22 is comparatively small.

In view of the above, the control circuit 101 may determine the contact area of a hand or fingers of a user to the case main body 21 and the front cap 22 from the magnitude of change in the self-capacitance Cx of the case main body 21 and the front cap 22, and control the transmission operation state of the transmission circuit 102 based on the determination result.

For example, the control circuit 101 controls the transmission circuit 102 to the state of the power saving mode when the contact area of a hand or fingers of a user to the case main body 21 and the front cap 22 is comparatively small and the control circuit 101 determines that the present state is the state in which the user is merely picking up the transmission-type electronic pen. Furthermore, the control circuit 101 controls the transmission circuit 102 to cause the transmission circuit 102 to become the normal operation state when the contact area of the hand or fingers of the user to the case main body 21 and the front cap 22 becomes large and the control circuit 101 determines that the present state is the state in which the user tightly holds the transmission-type electronic pen and intends to start position indication.

Fifth Embodiment

Figure 12A:
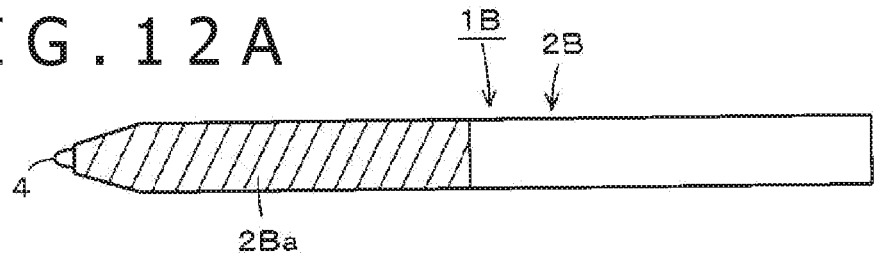
FIGS. 12A and 12B are high level diagrams of an example configuration of another embodiment of the transmission-type electronic pen.
Figure 12B:
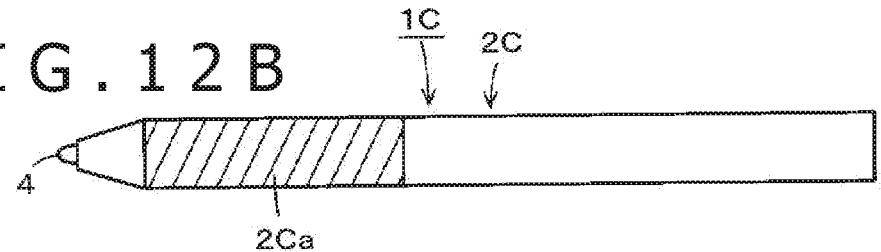

In the above-described first and second embodiments, almost the whole of the case 2 of the transmission-type electronic pens 1 and 1A is composed of a conductor for detection of contact by a hand or finger of a user. However, only one part of the case 2 expected to be held when a user starts use of the transmission-type electronic pen 1 or 1A may be composed of a conductor. For example, as shown with oblique lines in FIG. 12A, a configuration may be made in which a conductor is employed only for a half part 2Ba (including the front cap 22) on the side of the core body 4 in the axial center direction in a tubular case 2B of a transmission-type electronic pen 1B having the same configuration as the transmission-type electronic pen 1. Furthermore, as shown with oblique lines in FIG. 12B, a configuration may be made in which a conductor is employed only for a part 2Ca that is a part of half or less on the side of the core body 4 in the axial center direction in a tubular case 2C of a transmission-type electronic pen 1C having the same configuration as the transmission-type electronic pen 1 and is except for the part equivalent to the front cap 22. The parts 2Ba and 2Ca of the case 2B are not connected to but separated from the earth conductor of the printed board 8.

Sixth Embodiment

Furthermore, the control circuit 101 may control the transmission operation state of the transmission circuit 102 according to the position with which a user brings a hand or finger into contact in the axial center direction in the conductor part of the case 2 of the transmission-type electronic pen.

Figure 13A:
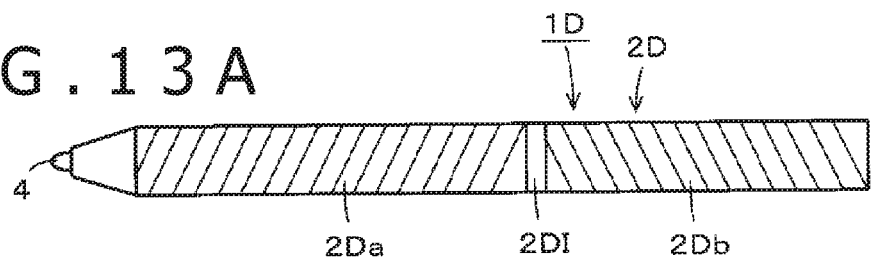
FIGS. 13A-13C are high level diagrams of an example configuration of another embodiment of the transmission-type electronic pen.
Figure 13B:
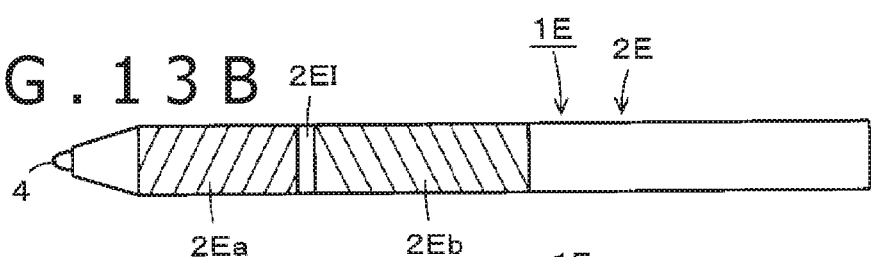
Figure 13C:
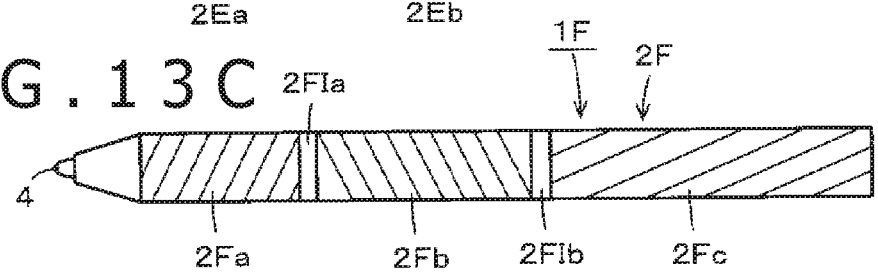

FIGS. 13A to 13C are diagrams showing examples of transmission-type electronic pens 1D, 1E, and 1F in which the control circuit 101 controls the transmission operation state of the transmission circuit 102 according to the position with which a user brings a hand or finger into contact in the axial center direction.

In the transmission-type electronic pen 1D of the example of FIG. 13A, a case 2D is composed of an insulator 2DI at substantially the central part in the axial center direction, a conductor 2Da on the side of the core body 4 relative to this insulator 2DI, and a conductor 2Db on the opposite side to the side of the core body 4. Furthermore, the circuit is configured such that the respective conductors 2Da and 2Db are separately connected to the control circuit 101 such that change in self-capacitance can be detected in the control circuit 101 based on a configuration similar to the above-described configuration.

In this example of FIG. 13A, when a user holds the part of the conductor 2Db with a hand or fingers, it can be guessed that merely the transmission-type electronic pen 1D is picked up, and therefore the control circuit 101 carries out control to set the transmission circuit 102 to the state of the power saving mode. Furthermore, when a user holds the part of the conductor 2Da with a hand or fingers, it can be guessed that the user intends to carry out position indication by the transmission-type electronic pen 1D, and, therefore, the control circuit 101 carries out control to set the transmission circuit 102 to the normal transmission operation state.

In the transmission-type electronic pen 1E of the example of FIG. 13B, in a case 2E, a part on the side of the core body 4 as almost half in the axial center direction is composed of a conductor. An insulator 2E1 is used for substantially the central part of the conductor part and the conductor part is separated into a conductor 2Ea on the side of the core body 4 and a conductor 2Eb on the opposite side to the side of the core body 4 by this insulator 2E1. Furthermore, the circuit is configured so that the respective conductors 2Ea and 2Eb are separately connected to the control circuit 101 such that change in self-capacitance can be detected in the control circuit 101 based on a configuration similar to the above-described configuration.

In this example of FIG. 13B, when a user holds the part of the conductor 2Eb with a hand or fingers, it can be guessed that the user is merely holding the transmission-type electronic pen 1E and the state for carrying out position indication by the transmission-type electronic pen 1E has not yet been established, and therefore the control circuit 101 carries out control to set the transmission circuit 102 to the state of the power saving mode. Furthermore, when a user holds the part of the conductor 2Ea with a hand or fingers, it can be guessed that the user intends to carry out position indication by the transmission-type electronic pen, and therefore the control circuit 101 carries out control to set the transmission circuit 102 to the normal transmission operation state.

In the transmission-type electronic pen 1F of the example of FIG. 13C, in a case 2F, three conductors 2Fa, 2Fb, and 2Fc are formed to substantially trisect the case 2F in the axial center direction. In this case, the conductors 2Fa and 2Fb are insulated by an insulator 2FIa and the conductors 2Fb and 2Fc are insulated and separated by an insulator 2FIb. Furthermore, the circuit is so configured that the respective conductors 2Fa, 2Fb, and 2Fc are separately connected to the control circuit 101 such that change in self-capacitance can be detected in the control circuit 101 based on a configuration similar to the above-described configuration.

In this example of FIG. 13C, when a user holds the part of the conductors 2Fc and 2Fb with a hand or fingers, it can be guessed that the user is merely holding the transmission-type electronic pen 1E and the state for carrying out position indication by the transmission-type electronic pen 1E has not yet been established, and therefore the control circuit 101 carries out control to set the transmission circuit 102 to the state of the power saving mode. Furthermore, when a user holds the part of the conductor 2Fa with a hand or fingers, it can be guessed that the user intends to carry out position indication by the transmission-type electronic pen, and therefore the control circuit 101 carries out control to set the transmission circuit 102 to the normal transmission operation state.

In the case of the above-described FIGS. 13A to 13C, the transmission circuit 102 may be kept stopping transmission instead of setting the transmission circuit 102 to the power saving mode. Furthermore, in this case, when the transmission circuit 102 is in the transmission operation state, the transmission of the transmission circuit 102 may be stopped when the part of the conductor 2Db, the part of the conductor 2Eb, or the part of the conductors 2Fc and 2Fb is held.

In the case of the example of FIG. 13A and the case of the example of FIG. 13C, the following modification example is also possible. Specifically, the transmission-type electronic pen is configured to carry out not only transmission of a signal SA from the core body 4 of an electrical conductor but also transmission of a signal SB from the lid side on the opposite side to the core body 4 in the case 2 in the axial center direction. In this case, the signal SA and the signal SB are given different frequencies, different patterns, or the like so that both can be discriminated on the position detecting device side. Furthermore, in the case of this example, not only is the configuration so made as to allow detection of application of a writing pressure to the core body 4 but the configuration is so made as to allow detection of application of a writing pressure also regarding the lid side on the opposite side to the core body 4.

Furthermore, in the case of the transmission-type electronic pen of the example in which the signal SB is also transmitted from the lid side, in the configuration example of FIG. 13A or FIG. 13C, control is so carried out so that the signal SA is transmitted from the core body 4 when a user holds the part of the conductor 2Da or 2Fa with a hand or fingers and the signal SB is transmitted from the lid side on the opposite side to the core body 4 when the user holds the part of the conductor 2Db or 2Fc with a hand or fingers. Furthermore, also in this example, in each of the case in which the user holds the part of the conductor 2Da or 2Fa with a hand or fingers and the case in which the user holds the part of the conductor 2Db or 2Fc with a hand or fingers, with reference also to the detection result of application of a writing pressure, the transmission operation state about the signal SA or the signal SB is controlled to carry out power saving control similar to the above-described first embodiment and second embodiment.

The conductors 2Da and 2Db of the case 2D, the conductors 2Ea and 2Eb of the case 2E, and the conductors 2Fa, 2Fb, and 2Fc of the case 2F are not connected to but separated from the ground conductor of the printed board 8.

Seventh Embodiment

The transmission circuit 102 of the transmission-type electronic pens of the above-described embodiments internally includes an oscillator. However, the embodiments can be applied also to a transmission-type electronic pen including a transmission circuit that transmits a signal without internally including an oscillator as in the above-described embodiments.

Figure 14:
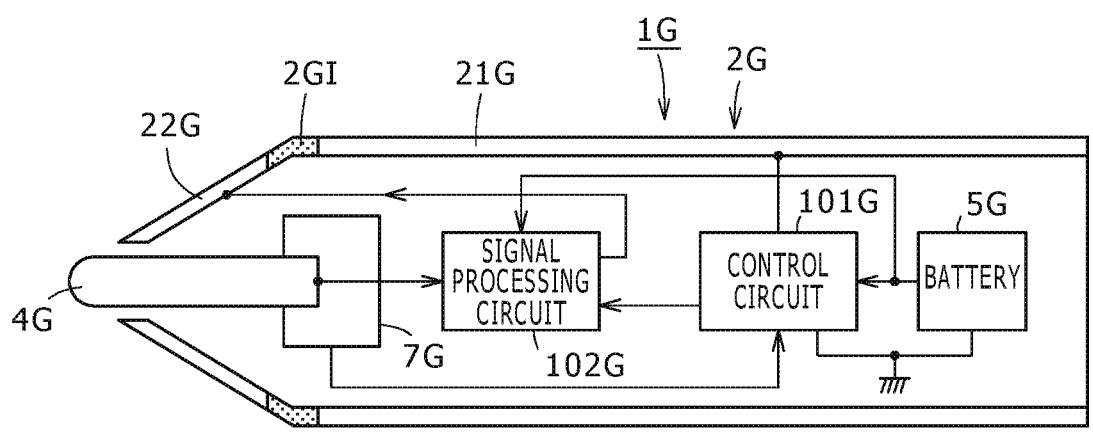
FIG. 14 is a diagram of an example configuration of another embodiment of the transmission-type electronic pen.

FIG. 14 is a diagram showing a configuration example of a transmission-type electronic pen 1G of this example. The transmission-type electronic pen 1G of this example has a configuration similar to that of an electronic pen disclosed in e.g., a prior document: Japanese Patent Publication No. 2012-221304.

As shown in FIG. 14, a tubular case 2G of the transmission-type electronic pen 1G of this example includes a case main body 21G composed of a conductor and a front cap 22G composed of a conductor. The case main body 21G and the front cap 22G are insulated by an insulating member 2GI. In the tubular case 2G, a control circuit 101G, a signal processing circuit 102G, a battery 5G, and a writing pressure detecting module 7G are housed. A core body 4G composed of a conductor is arranged to be fitted to the writing pressure detecting module 7G.

The core body 4G, the writing pressure detecting module 7G, the control circuit 101G, and the battery 5G are given the same configurations as the above-described embodiments. A variable-capacitance capacitor that forms the writing pressure detecting module 7G is connected to the control circuit 101G as with the above-described embodiments and the control circuit 101G is configured to be capable of detecting the writing pressure applied to the core body 4G based on change in the capacitance of this variable-capacitance capacitor.

Furthermore, the case main body 21G is connected to the control circuit 101G as with the above-described embodiments and the control circuit 101G is configured to detect contact of a hand or finger of a user with the case main body 21G. As shown in FIG. 14, one terminal of the battery 5G is connected to the ground conductor of the printed board and this ground conductor is separated from the conductors 21G and 22G.

A position detecting device used with the transmission-type electronic pen 1G of this example transmits a signal to the transmission-type electronic pen 1G. The transmission-type electronic pen 1G of this example receives a signal sent from the position detecting device and supplies the received signal to the signal processing circuit 102G. The signal processing circuit 102G accentuates the input received signal through amplification or the like to generate a transmission signal by the transmission-type electronic pen 1G. Then, the signal processing circuit 102G transmits the generated transmission signal to feed it back to the position detecting device.

In this example, a signal from the position detecting device is received by the core body 4G and the received signal is supplied to the signal processing circuit 102G. The signal processing circuit 102G transmits a generated transmission signal to the position detecting device through the front cap 22G composed of a conductor. The configuration may be made such that a signal from the position detecting device is received by the front cap 22G and the received signal is supplied to the signal processing circuit 102G and a signal generated by the signal processing circuit 102G is fed back to the position detecting device through the core body 4G.

Therefore, the signal processing circuit 102G forms a transmission circuit in the transmission-type electronic pen 1G and accentuates a received signal through amplification or the like as the transmission operation state. The control circuit 101G is configured to control activation and the transmission operation state of this signal processing circuit 102G.

Furthermore, in the transmission-type electronic pen 1G of this example, the control circuit 101G controls activation and the transmission operation state of the signal processing circuit 102G to carry out power saving control similarly to the above-described embodiments based on a detection result of contact of a hand or finger of a user with the case main body 21G and a detection result of the writing pressure applied to the core body 4G based on change in the capacitance of the variable-capacitance capacitor of the writing pressure detecting module 7.

In the case of this example, the normal transmission operation state in the signal processing circuit 102G is the state in which a signal obtained by accentuating a received signal through amplification to allow the position detecting device to sufficiently detect an indicated position is generated. Furthermore, the transmission operation state of the power saving mode of the signal processing circuit 102G is the state in which the hover state of the transmission-type electronic pen 1G can be detected in the position detecting device but the amplitude of the generated signal is set lower than in the normal transmission operation state or a signal whose repetition cycle of a predetermined pattern like the above-described one is set longer than in the normal transmission operation state is generated.

Therefore, the same effects as the above-described embodiments are achieved also in the transmission-type electronic pen 1G of this fourth embodiment.

[Other Embodiments/Modification Examples]

In the second embodiment, the third embodiment, and the fourth embodiment, the power saving mode may be set at not one stage but multiple stages. Furthermore, in the second embodiment, the third embodiment, and the fourth embodiment, a transition may be made directly to the sleep mode without going through the power saving mode when a predetermined time elapses without detection of a writing pressure in the normal operation mode.

Moreover, the method for detecting the state in which a hand or finger of a human body is in contact with the case main body 21 or the front cap 22 in the circuit configuration shown in FIG. 5 is none limiting example. A configuration is also possible in which the case main body 21 and the front cap 22 are connected to a specific terminal of an IC that forms the control circuit 101 and one capacitance for integration is externally arranged. In addition, the capacitive touch detection method for detecting the state in which a hand or finger of a human body is in contact with the case main body 21 or the front cap 22 may be either a self-induction system (self capacitance) or a mutual induction system (mutual capacitance).

Furthermore, in the above-described embodiments, the writing pressure detector is an example of pressure sensor. The variable-capacitance capacitor in which a dielectric is sandwiched by a first electrode and a second electrode is used and the capacitance is allowed to vary according to the writing pressure by permitting one of the first electrode and the second electrode to move in the axial center direction according to the writing pressure. However, the writing pressure detector is not limited to this configuration. For example, it is also possible to form the writing pressure detector by using a semiconductor element that allows capacitance to vary according to the writing pressure like one disclosed in Japanese Patent Publication No. 2013-161307. Furthermore, the writing pressure detector may be formed by using a structure or element that allows not capacitance but an inductance value or resistance value to vary according to the writing pressure.

Furthermore, in the above-described embodiments, the writing pressure detector that can continuously measure the writing pressure value is used as the pressure sensor. However, a switch (tact switch) that is turned on according to the pressure applied to the core body may be used instead of the writing pressure detector and detection of whether the switch is turned on may be made. Moreover, as the pressure sensor, a pressure sensing resistor sensor that generates a resistance value according to the pressure applied to the core body may be used instead of the switch. Alternatively, an optical sensor that includes a light emitting element and a light receiving element may be used. The optical sensor has a configuration in which the amount of light reception in the light receiving element is changed according to the pressure applied to the core body.

The case in which the transmission-type electronic pen of the above-described embodiment is an electronic pen of the capacitive system used with a position detecting device of the capacitive system is employed. However, the transmission-type electronic pen of the above-described embodiment can be similarly applied also to the case of a transmission-type electronic pen of the electromagnetic induction system.

Furthermore, a transmission-type electronic pen of a type internally including a primary battery is employed as the transmission-type electronic pens of the above-described embodiments. However, a transmission-type electronic pen of a charge system may be used that internally includes a secondary battery or internally includes an electric double-layer capacitor and charges them by a charge device, of course.

DESCRIPTION OF REFERENCE SYMBOLS 1, 1A, 1B, 1C, 1D, 1E, 1F, 1G Transmission-type electronic pen,
2 Case (casing),
4 Core body,
5 Battery,
6 Core body holder,
7 Writing pressure detecting module,
8 Printed board,
21 Case main body,
22 Front cap,
101 Control circuit,
102 Transmission circuit, and
102G Signal processing circuit The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A transmission-type electronic pen used with a position detecting device, the transmission-type electronic pen comprising:
   a tubular casing;
   a core body arranged in the casing such that a tip of the core body protrudes to extend from one opening of the casing;
   a conductor placed near the one opening of the casing;
   a pressure detection circuit configured to detect whether a pressure is applied to the tip of the core body; and
   a signal transmission circuit;
   a signal processing circuit configured to control, in cooperation with the signal transmission circuit, electrostatic transmission of a position indicating signal, via the conductor, to the position detecting device; and
   a contact detection circuit configured to detect whether a user's body is in contact with the casing;
   wherein,
   the signal processing circuit is operable in different operation modes including a first operation mode, in which the position indicating signal is not transmitted via the conductor, a second operation mode, in which the position indicating signal is transmitted via the conductor, and a third operation mode, in which the position indicating signal is transmitted via the conductor wherein a repetition cycle of the position indicating signal transmitted to the position detecting device is longer in the third operation mode than in the second operation mode, the signal processing circuit is operable, in response to the contact detection circuit detecting a user body contact with the casing, to transition from the first operation mode to the second operation mode or to the third operation mode, and the signal processing circuit is operable, in response to the pressure detection circuit not detecting a defined pressure within a defined time period after transitioning to the second operation mode, to transition back from the second operation mode to the first operation mode.

2. The transmission-type electronic pen according to claim 1, wherein:

the signal processing circuit is operable, in response to the pressure detection circuit detecting a defined pressure after transitioning to the third operation mode, to transition from the third operation mode to the second operation mode.

3. The transmission-type electronic pen according to claim 2, wherein:

an amplitude of the position indicating signal is lower in the third operation mode than in the second operation mode.

4. The transmission-type electronic pen according to claim 1, wherein the contact detection circuit is configured to detect whether a user's hand is in contact with the casing.

5. The transmission-type electronic pen according to claim 1, wherein the conductor forms the core body.

6. A transmission-type electronic pen used with a position detecting device, the transmission-type electronic pen comprising:

a tubular casing;
a core body arranged in the casing such that a tip of the core body protrudes to extend from one opening of the casing;
a conductor placed near the one opening of the casing;
a pressure detection circuit configured to detect whether a pressure is applied to the tip of the core body; and
a signal transmission circuit;
a signal processing circuit configured to control, in cooperation with the signal transmission circuit, electrostatic transmission of a position indicating signal, via the conductor, to the position detecting device; and
a motion sensor circuit configured to detect a motion of the casing;
wherein,
the signal processing circuit is operable in different operation modes including a first operation mode, in which the position indicating signal is not transmitted via the conductor, a second operation mode, in which the position indicating signal is transmitted via the conductor, and a third operation mode, in which the position indicating signal is transmitted via the conductor wherein a repetition cycle of the position indicating signal transmitted to the position detecting device is longer in the third operation mode than in the second operation mode,
the signal processing circuit is operable, in response to the motion sensor circuit detecting a motion of the casing, to transition from the first operation mode to the second operation mode or to the third operation mode, and the signal processing circuit is operable, in response to the pressure detection circuit not detecting a defined pressure within a defined time period after transitioning to the second operation mode, to transition back from the second operation mode to the first operation mode.

7. The transmission-type electronic pen according to claim 6, wherein:

the signal processing circuit is operable, in response to the pressure detection circuit detecting a defined pressure after transitioning to the third operation mode, to transition from the third operation mode to the second operation mode.

8. The transmission-type electronic pen according to claim 7, wherein:

an amplitude of the position indicating signal is lower in the third operation mode than in the second operation mode.

9. A transmission-type electronic pen used with a position detecting device, the transmission-type electronic pen comprising:

a tubular casing;
a core body arranged in the casing such that a tip of the core body protrudes to extend from one opening of the casing;
a conductor placed near the one opening of the casing;
a pressure detection circuit configured to detect whether a pressure is applied to the tip of the core body; and
a signal transmission circuit;
a signal processing circuit configured to control, in cooperation with the signal transmission circuit, electrostatic transmission of a position indicating signal, via the conductor, to the position detecting device; and
a contact detection circuit configured to detect whether a user's body is in contact with the casing;
wherein,
the signal processing circuit is operable in different operation modes including a first operation mode, in which the position indicating signal is not transmitted via the conductor, a second operation mode, in which the position indicating signal is transmitted via the conductor, and a third operation mode, in which the position indicating signal is transmitted via the conductor wherein a repetition cycle of the position indicating signal transmitted to the position detecting device is longer in the third operation mode than in the second operation mode,
the signal processing circuit is operable, in response to the contact detection circuit detecting a user body contact with the casing and the pressure detection circuit detecting a defined pressure, to enter into the second operation mode, and
the signal processing circuit is operable, in response to the pressure detection circuit not detecting a defined pressure, to transition from the second operation mode to the first operation mode upon expiration of a second time period after entering into the second operation mode.

10. The transmission-type electronic pen according to claim 9, wherein:

the signal processing circuit is operable to transition from the third operation mode to the first operation mode upon expiration of a third time period after transitioning to the third operation mode.

11. The transmission-type electronic pen according to claim 10, wherein:
an amplitude of the position indicating signal is lower in the third operation mode than in the second operation mode.

12. The transmission-type electronic pen according to claim 9, wherein the contact detection circuit is configured to detect whether a user's hand is in contact with the casing.

13. A transmission-type electronic pen used with a position detecting device, the transmission-type electronic pen comprising:
a tubular casing;
a core body arranged in the casing such that a tip of the core body protrudes to extend from one opening of the casing;
a conductor placed near the one opening of the casing;
a pressure detection circuit configured to detect whether a pressure is applied to the tip of the core body; and
a signal transmission circuit;
a signal processing circuit configured to control, in cooperation with the signal transmission circuit, electrostatic transmission of a position indicating signal, via the conductor, to the position detecting device; and
a motion sensor circuit configured to detect a motion of the casing;
wherein,
the signal processing circuit is operable in different operation modes including a first operation mode, in which the position indicating signal is not transmitted via the conductor, a second operation mode, in which the position indicating signal is transmitted via the conductor, and a third operation mode, in which the position indicating signal is transmitted via the conductor wherein a repetition cycle of the position indicating signal transmitted to the position detecting device is longer in the third operation mode than in the second operation mode,
the signal processing circuit is operable, in response to the motion sensor circuit detecting a motion of the casing and the pressure detection circuit detecting a defined pressure, to enter into the second operation mode, and
the signal processing circuit is operable, in response to the pressure detection circuit not detecting a defined pressure, to transition from the second operation mode to the first operation mode upon expiration of a second time period after entering into the second operation mode.

14. The transmission-type electronic pen according to claim 13, wherein:
the signal processing circuit is operable to transition from the third operation mode to the first operation mode upon expiration of a third time period after transitioning to the third operation mode.

15. The transmission-type electronic pen according to claim 14, wherein:
an amplitude of the position indicating signal is lower in the third operation mode than in the second operation mode.

16. A transmission-type electronic pen used with a position detecting device, the transmission-type electronic pen comprising:
a tubular casing;
a core body arranged in the casing such that a tip of the core body protrudes to extend from one opening of the casing;
a first conductor and a second conductor placed near the one opening of the casing;
a pressure detection circuit configured to detect whether a pressure is applied to the tip of the core body; and
a signal transmission circuit;
a signal reception circuit configured to receive a detector signal transmitted from the position detecting device via the second conductor;
a signal processing circuit configured to control, in response to the detector signal and in cooperation with the signal transmission circuit, electrostatic transmission of a position indicating signal, via the first conductor, to the position detecting device; and
a contact detection circuit configured to detect whether a user's body is in contact with the casing;
wherein,
the signal processing circuit is operable in different operation modes including a first operation mode, in which the position indicating signal is not transmitted via the first conductor, a second operation mode, in which the position indicating signal is transmitted via the first conductor conductor and a third operation mode, in which the Position indicating signal is transmitted via the first conductor wherein a repetition cycle of the position indicating signal transmitted to the position detecting device is longer in the third operation mode than in the second operation mode,
the signal processing circuit is operable, in response to the contact detection circuit detecting a user body contact with the casing, to transition from the first operation mode to the second operation mode, and
the signal processing circuit is operable, in response to the pressure detection circuit not detecting a defined pressure within a defined time period after transitioning to the second operation mode, to transition back from the second operation mode to the first operation mode.

17. The transmission-type electronic pen according to claim 16, wherein:
the signal processing circuit is operable, in response to the pressure detection circuit detecting a defined pressure after transitioning to the third operation mode, to transition from the third operation mode to the second operation mode.

18. The transmission-type electronic pen according to claim 17, wherein:
an amplitude of the position indicating signal is lower in the third operation mode than in the second operation mode.

19. The transmission-type electronic pen according to claim 16, wherein the contact detection circuit is configured to detect whether a user's hand is in contact with the casing.

20. The transmission-type electronic pen according to claim 16, wherein the first conductor forms the core body.

21. The transmission-type electronic pen according to claim 16, wherein the signal reception circuit is configured to receive a signal from the position detecting device via the second conductor.

22. A transmission-type electronic pen used with a position detecting device, the transmission-type electronic pen comprising:
a tubular casing;
a core body arranged in the casing such that a tip of the core body protrudes to extend from one opening of the casing;
a first conductor and a second conductor placed near the one opening of the casing;

a pressure detection circuit configured to detect whether a pressure is applied to the tip of the core body; and a signal transmission circuit;

a signal reception circuit configured to receive a detector signal transmitted from the position detecting device via the second conductor;

a signal processing circuit configured to control, in response to the detector signal, and in cooperation with the signal transmission circuit, electrostatic transmission of a position indicating signal, via the first conductor, to the position detecting device; and a motion sensor circuit configured to detect a motion of the casing;

wherein, the signal processing circuit is operable in different operation modes including a first operation mode, in which the position indicating signal is not transmitted via the first conductor, a second operation mode, in which the position indicating signal is transmitted via the first conductor, and a third operation mode, in which the position indicating signal is transmitted via the first conductor wherein a repetition cycle of the position indicating signal transmitted to the position detecting device is longer in the third operation mode than in the second operation mode, the signal processing circuit is operable, in response to the motion sensor circuit detecting a motion of the casing, to transition from the first operation mode to the second operation mode, and the signal processing circuit is operable, in response to the pressure detection circuit not detecting a defined pressure within a defined time period after transitioning to the second operation mode, to transition back from the second operation mode to the first operation mode.

23. The transmission-type electronic pen according to claim 22, wherein:

the signal processing circuit is operable, in response to the pressure detection circuit detecting a defined pressure after transitioning to the third operation mode, to transition from the third operation mode to the second operation mode.

24. The transmission-type electronic pen according to claim 23, wherein:

an amplitude of the position indicating signal is lower in the third operation mode than in the second operation mode.

25. The transmission-type electronic pen according to claim 22, wherein the first conductor forms the core body.

26. The transmission-type electronic pen according to claim 22, wherein the signal reception circuit is configured to receive a signal from the position detecting device via the second conductor.

* * * * *

UNITED STATES PATENT AND TRADEMARK OFFICE
CERTIFICATE OF CORRECTION

PATENT NO.        : 10,739,873 B2
APPLICATION NO.   : 16/293071
DATED             : August 11, 2020
INVENTOR(S)       : Hideo Tamura Page 1 of 1

It is certified that error appears in the above-identified patent and that said Letters Patent is hereby corrected as shown below:

In the Claims

Column 34, Claim 16, Lines 20-21:
"the first conductor conductor and a"
Should be:
-- the first conductor, and a --.

Column 34, Claim 16, Line 22:
"the Position"
Should be:
-- the position --.

Column 35, Claim 22, Line 9:
"the detector signal, and in cooperation"
Should be:
-- the detector signal and in cooperation --.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*